United States Patent [19]
Keefer et al.

[11] Patent Number: 6,051,050
[45] Date of Patent: Apr. 18, 2000

[54] MODULAR PRESSURE SWING ADSORPTION WITH ENERGY RECOVERY

[75] Inventors: Bowie G. Keefer, Vancouver; David G. Doman, Delta, both of Canada

[73] Assignee: Questor Industries Inc., Burnaby, Canada

[21] Appl. No.: 08/995,906

[22] Filed: Dec. 22, 1997

[51] Int. Cl.$^7$ ........................ B01D 53/047; B01D 53/06
[52] U.S. Cl. ................................ 95/96; 95/101; 95/102; 95/105; 95/113; 95/130; 96/125; 96/130; 96/144
[58] Field of Search ................ 95/96–106, 113, 95/130; 96/115, 125, 130, 144, 150

[56] References Cited

U.S. PATENT DOCUMENTS

| | | | |
|---|---|---|---|
| 2,344,384 | 3/1944 | Altenkirch | 96/115 |
| 3,176,446 | 4/1965 | Siggelin | 96/118 |
| 3,201,921 | 8/1965 | Heyes | 96/125 X |
| 4,194,891 | 3/1980 | Earls et al. | 96/115 X |
| 4,452,612 | 6/1984 | Mattia | 95/100 |
| 4,530,705 | 7/1985 | Firey | 96/116 |
| 4,702,903 | 10/1987 | Keefer | 95/96 X |
| 4,758,253 | 7/1988 | Davidson et al. | 95/97 |
| 4,778,670 | 10/1988 | Pinto | 95/96 X |
| 4,793,832 | 12/1988 | Veltman et al. | 95/96 X |
| 4,801,308 | 1/1989 | Keefer | 96/125 X |
| 4,816,121 | 3/1989 | Keefer | 95/96 X |
| 4,948,401 | 8/1990 | Izumi et al. | 96/115 |
| 4,968,329 | 11/1990 | Keefer | 96/130 X |
| 5,082,473 | 1/1992 | Keefer | 96/130 X |
| 5,096,469 | 3/1992 | Keefer | 96/130 X |
| 5,133,784 | 7/1992 | Boudet et al. | 96/125 X |
| 5,246,676 | 9/1993 | Hay | 423/219 |
| 5,248,325 | 9/1993 | Kagimoto et al. | 96/125 |
| 5,256,172 | 10/1993 | Keefer | 96/115 X |
| 5,393,326 | 2/1995 | Engler et al. | 95/103 |
| 5,403,384 | 4/1995 | Faul et al. | 95/96 |
| 5,441,559 | 8/1995 | Petit et al. | 96/125 |
| 5,487,775 | 1/1996 | LaCava et al. | 96/125 X |
| 5,593,478 | 1/1997 | Hill et al. | 96/115 X |
| 5,827,358 | 10/1998 | Kulish et al. | 96/115 |

FOREIGN PATENT DOCUMENTS

WO 94/04249  3/1994  Belgium.

*Primary Examiner*—Robert Spitzer

[57] ABSTRACT

Pressure swing adsorption (PSA) separation of a feed gas mixture is performed within an apparatus having typically a single prime mover powering a feed compressor for one or multiple rotary PSA modules in parallel, each module including a rotor with a large number of angularly spaced adsorber elements, with valve surfaces between the rotor and a stator so that individual adsorber elements are opened to compartments for staged pressurization and blowdown, with thermally boosted energy recovery from staged expansion of countercurrent blowdown and light reflux gases, and a plurality of adsorber elements opened at any instant to each compartment so that each compressor and expander stage operates under substantially steady conditions of flow and pressure.

107 Claims, 20 Drawing Sheets

MODULAR PRESSURE SWING ADSORPTION WITH ENERGY RECOVERY

TECHNICAL FIELD

The invention relates to gas separations conducted by pressure swing adsorption, and in particular applications to oxygen or nitrogen separation from air and to hydrogen purification.

BACKGROUND ART

Gas separation by pressure swing adsorption (PSA) is achieved by coordinated pressure cycling and flow reversals over an adsorbent bed which preferentially adsorbs a more readily adsorbed component relative to a less readily adsorbed component of the mixture. The total pressure is elevated during intervals of flow in a first direction through the adsorbent bed from a first end to a second end of the bed, and is reduced during intervals of flow in the reverse direction. As the cycle is repeated, the less readily adsorbed component is concentrated in the first direction, while the more readily adsorbed component is concentrated in the reverse direction.

A "light" product, depleted in the more readily adsorbed component and enriched in the less readily adsorbed component, is then delivered from the second end of the bed. A "heavy" product enriched in the more strongly adsorbed component is exhausted from the first end of the bed. The light product is usually the desired product to be purified by PSA, and the heavy product often a waste product, as in the important examples of oxygen separation over nitrogen-selective zeolite adsorbents and hydrogen purification. The heavy product is a desired product in the example of nitrogen separation over nitrogen-selective zeolite adsorbents. Typically, the feed is admitted to the first end of a bed and the second product delivered from the second end of the bed when the pressure in that bed is elevated to a higher working pressure, while the second product is exhausted from the first end of the bed at a lower working pressure which is the low pressure of the cycle.

The conventional process for gas separation by pressure swing adsorption uses two or more adsorbent beds in parallel, with directional valving at each end of each adsorbent bed to connect the beds in alternating sequence to pressure sources and sinks, thus establishing the changes of working pressure and flow direction. This conventional pressure swing adsorption process makes inefficient use of applied energy, because of irreversible expansion over the valves over large pressure differences while switching the adsorbent beds between higher and lower pressures.

Keefer (U.S. Pat. No. 5,256,172) discloses the use of expansion turbines to recover power by the principle of thermally coupled pressure swing adsorption, in which expansion energy of the PSA cycle is recovered and heat may be applied directly through an integrated regenerative thermodynamic cycle (regenerative Brayton cycle, or a modified Ericsson cycle) as a supplemental energy source to perform pressure swing adsorption gas separations.

Schartz (PCT publication WO 94/04249) and Firey (U.S. Pat. No. 4,530,705) disclose the use of expanders for partial recovery of energy from countercurrent blowdown gas.

Hay (U.S. Pat. No. 5,246,676) and Engler (U.S. Pat. No. 5,393,326) provide examples of vacuum swing adsorption systems, in which a plurality of vacuum pumps are used to pump down each adsorbent bed being regenerated sequentially in turn, with the pumps operating at successively lower pressures, so that each vacuum pump pumps one bed at a time as the pressure in that bed decreases over a pressure interval, during a pumping time interval for each bed typically equal to the cycle period divided by the number of beds. In these and other prior art devices, the vacuum pumps are subject to varying pressure load over each pumping step on a bed, so that the machines are loaded severely by the cyclically changing duty as well as operating on average less efficiently than under true steady state conditions.

With relatively low PSA cycle frequencies attainable with conventional granular adsorbent beds, the adsorber pressure vessels are bulky and costly. One approach addressing this problem is use of rigid high surface area adsorbent supports which can overcome the limitations of granular adsorbent and enable much higher cycle frequencies. High surface area laminated sheet adsorbent supports, comprised of stacked or spirally wound adsorbent-impregnated sheet material, are disclosed in Keefer's U.S. Pat. Nos. 4,801,308; 4,968,329; and 5,082,473.

For large industrial PSA systems, mechanical immobilization of the adsorbent beds has not been practicable. Careful flow control is required to ensure that pressure gradients in the adsorbent bed are kept low, well below the onset of fluidization.

A further limitation to the use of finely granular adsorbent beds for PSA and other gas separation processes arises as increasingly smaller particle diameters are considered in order to reduce the macropore diffusion mass transfer resistance as required for higher frequency operation. It is well known (as outlined by D. M. Ruthven in "Principles of Adsorption and Adsorption Processes", Wiley, 1984, pages 210–211) that, owing to a tendency of very small particles to cluster and pack unevenly, "the advantage of reduced pore diffusional resistance which is gained by reduction of particle size can easily be offset by increased axial dispersion" for beds packed of small particles.

As operation of PSA processes at high frequencies requires small particle sizes to reduce the diffusional time constant, while the increased axial dispersion prevents a reduction of bed length commensurate with smaller particle diameter, performance tends to degrade due to high pressure drop and bed attrition problems. Hence, cycle frequencies much above 20 cycles per minute have been impracticable in sustained industrial applications, except by use of laminated sheet adsorbent support as mentioned above.

Mattia (U.S. Pat. No. 4,452,612), Davidson and Lywood (U.S. Pat. No. 4,758,253), Boudet et al (U.S. Pat. No. 5,133,784), Petit et al (U.S. Pat. No. 5,441,559) and Schartz (PCT publication WO 94/04249) disclose PSA devices using rotary adsorbent bed configurations. Ports for multiple angularly separated adsorbent beds mounted on a rotor assembly sweep past fixed ports for feed admission, product delivery and pressure equalization; with the relative rotation of the ports providing the function of a rotary distributor valve. Related devices are disclosed by Kagimoto et al (U.S. Pat. No. 5,248,325) and LaCava et al (U.S. Pat. No. 5,487,775). All of these prior art devices use multiple adsorbent beds operating sequentially on the same cycle, with multiport distributor rotary valves for controlling gas flows to, from and between the adsorbent beds.

However, a rotary adsorbent bed assembly based on these prior art devices may be impracticable for large PSA units, owing to the weight of the rotating assembly. Also, when separating gas components which are highly inflammable or toxic, the rotary adsorbent bed assembly would need to be completely enclosed in a containment shroud to capture any leakage from large diameter rotary seals. Hence, PSA devices with stationary adsorbent beds have remained referred for larger scale systems, and for applications processing hazardous gases such as hydrogen.

Conventional PSA systems have considerable dead volume associated with the volume of pressure vessel heads, flow distributors and conduit pipework between the ends of the adsorbent column and the directional valves controlling the PSA cycle steps. Prior art rotary PSA devices also have considerable dead volume for flow distribution and collection, since the valve faces are again remote from the adsorbent bed ends. This problem would become proportionately worse if operation at higher cycle frequency were contemplated, since flow distribution would become more critical. These limitations would be especially severe for rotary PSA devices with radial flow through the adsorbent beds, and using either barrel or face valves whose valve surfaces are far separated from the adsorbers as illustrated by the devices of Boudet et al (U.S. Pat. No. 5,133,784), Petit et al (U.S. Pat. No. 5,441,559) and Schartz (PCT publication WO 94/04249).

DISCLOSURE OF INVENTION

The present invention is intended to enable high frequency operation of pressure swing and vacuum swing adsorption processes, with high energy efficiency and with compact equipment of low capital cost. The invention applies in particular to relatively low pressure processes conducted near atmospheric pressure, so that fluid sealing may be accomplished primarily by narrow clearances between revolving machine components and their housings.

Pressure swing adsorption (PSA) separation of a feed gas mixture is performed within an apparatus having typically a single prime mover powering a feed compressor for one or multiple rotary PSA modules in parallel, each module including a rotor with a large number of angularly spaced adsorbers or adsorber elements, with valve surfaces between the rotor and a stator so that individual adsorber elements are opened to compartments for staged pressurization and blowdown, and in preferred embodiments with thermally boosted energy recovery from staged expansion of countercurrent blowdown and light reflux gases, and a plurality of adsorber elements opened at any instant to each compartment so that each compressor and expander stage operates under substantially steady conditions of flow and pressure.

More precisely, the invention provides a process for PSA separation of a gas mixture containing a more readily adsorbed component and a less readily adsorbed component, with the more readily adsorbed component being preferentially adsorbed from the feed gas mixture by an adsorbent material under increase of pressure, so as to separate from the gas mixture a heavy product gas enriched in the more readily adsorbed component, and a light product gas enriched in the less readily adsorbed component and depleted in the more readily adsorbed component; providing for the process a cooperating set of adsorber elements within a rotor and angularly spaced about the axis defined by rotation of the rotor relative to a stator, and rotating the rotor at a rotational frequency so as to generate within each adsorber element cyclic variations of pressure and flow at a cyclic frequency along a flow path contacting the adsorbent material between first and second ends of the adsorber element, the cyclic variations of pressure extending between a higher pressure and a lower pressure of the process, and the ratio of the cycle frequency to the rotational frequency is an integer number; rotating the rotor so that the first ends of the adsorber elements successively communicate by first apertures to compartments of the stator and in a first valve surface between the rotor and the stator, and the second ends of the adsorber elements successively communicate by second apertures to compartments of the stator and in a second valve surface between the rotor and the stator; with the compartments including a feed compartment and a heavy product compartment in the first valve surface, a light product compartment in the second valve surface, blowdown compartments in the first and/or second valve surface, and pressurization compartments in the first and/or second valve surface; the process including:

(a) continuously supplying feed gas mixture to the feed compartment at substantially the higher pressure, and continuously withdrawing light product gas from the light product compartment at substantially the higher pressure less flow frictional pressure drops, (b) continuously withdrawing gas from blowdown compartments at an intermediate pressure between the higher and lower pressures for each blowdown compartment, (c) continuously withdrawing heavy product gas from the heavy product compartment at substantially the lower pressure, and (d) continuously supplying gas to pressurization compartments at an intermediate pressure between the higher and lower pressures for each pressurization compartment;

so that each adsorber element undergoes the steps in sequence at the cyclic frequency of:

(i) feed admission and light product withdrawal at substantially the higher pressure, (ii) a plurality of blowdown steps, in which the adsorber element releases gas successively to blowdown compartments in the first and/or second valve surface so as to reduce the pressure in the adsorber element to descending intermediate pressures for each blowdown step between the higher and lower pressures, (iii) heavy product withdrawal at substantially the lower pressure, and (iv) a plurality of pressurization steps, in which the adsorber element accepts gas successively from pressurization compartments in the first and/or second valve surface so as to increase the pressure in the adsorber element to ascending intermediate pressures for each pressurization step between the lower and the higher pressures;

with the rate of pressure change in the adsorber element during steps (ii) and (iv) limited by flow restriction across the first and second apertures, so that the maximum rate of pressure change during those steps is less than approximately five times the average rate of pressure change during those steps.

The blowdown steps for an adsorber element, descending by stepwise intermediate pressures from the higher pressure, will preferably be performed initially departing from the higher pressure as cocurrent blowdown from the second valve surface, and finally approaching the lower pressure as countercurrent blowdown from the first valve surface. At some intermediate pressure(s), blowdown may be conducted simultaneously from both the first and second valve surfaces. Cocurrent blowdown gas is enriched in the less readily adsorbed component and depleted in the more readily adsorbed component, while countercurrent blowdown gas is enriched in the more readily adsorbed component.

The term "light reflux" refers to withdrawal of light gas (enriched in the less readily adsorbed component) from adsorbers via the second valve surface, followed by pressure let-down and return of that light gas at the reduced pressure to adsorbers via the second valve surface. The term "heavy reflux" refers to withdrawal of heavy gas (enriched in the more readily adsorbed component) from adsorbers via the first valve surface, followed by mechanical recompression, and return of that heavy gas at the increased pressure to adsorbers via the first valve surface. Cocurrent blowdown gas withdrawn from the second valve surface to depressurize adsorbers will typically be returned, after pressure let-down to a lower pressure, as light reflux gas to another portion of the second valve surface either to purge adsorbers at the lower pressure or alternatively to repressurize adsorbers to intermediate pressures ascending from the lower pressure. Light reflux will be performed preferably in multiple stages, each stage proceeding from successively lower intermediate pressures. The first stage of light reflux will typically withdraw its light reflux gas from the second valve surface at the higher pressure, and subsequent stages will withdraw their light reflux gas as cocurrent blowdown steps.

A stage of light reflux is characterized as continuously withdrawing gas depleted in the more readily adsorbed component as light reflux gas from a light reflux exit compartment in the second valve surface at a light reflux exit pressure which is the higher pressure or an intermediate pressure less than the higher pressure, performing pressure let-down of the light reflux gas, and continuously returning the light reflux gas to a light reflux return compartment in the second valve surface at the lower pressure or an intermediate pressure less than the light reflux exit pressure. A light reflux exit compartment at an intermediate pressure less than the higher pressure is a cocurrent blowdown compartment. A light reflux return compartment at an intermediate pressure greater than the lower pressure is a light reflux pressurization compartment. The light reflux return compartment at the lower pressure is referred to as the purge compartment.

The apparatus of the invention is for PSA separation of such a gas mixture; the apparatus having one module or a plurality of modules in parallel, each module of the apparatus including a rotor cooperating with a stator mutually defining the rotational axis of the rotor, the rotor containing a cooperating set of adsorber elements angularly spaced about the rotational axis, each adsorber element having a flow path contacting the adsorbent material between first and second ends of the adsorber element, the first ends of the adsorber elements communicating by first apertures to a first valve surface between the rotor and the stator, and the second ends of the adsorber elements communicating by second apertures to a second valve surface between the rotor and the stator; the apparatus further including:

(a) a feed compartment in the stator and open to the first valve surface in a feed angular sector thereof, and means to supply feed gas continuously to the feed compartment at substantially the higher pressure, (b) a heavy product compartment in the stator and open to the first valve surface, and means to withdraw heavy product gas continuously from the heavy product compartment at substantially the lower pressure, (c) a light product compartment in the stator and open to the first valve surface, and means to withdraw light product gas continuously from the light product compartment at substantially the higher pressure less flow frictional pressure drops, (d) a plurality of pressurization compartments in the stator and open to the first and/or second valve surfaces, and means to supply pressurization gas to the pressurization compartments at an intermediate pressurization pressure for each pressurization compartment, and (e) a plurality of blowdown compartments in the stator and open to the first and/or second valve surfaces, and means to withdraw blowdown gas from the blowdown compartments at an intermediate blowdown pressure for each blowdown compartment.

The PSA separation is performed within a cooperating set of angularly spaced adsorber elements installed in the rotor of a rotary PSA module in which the rotor revolves within a stator or housing. The PSA cycle operates between a higher pressure and a lower pressure of the cycle, and includes a feed step at the higher pressure, a plurality of blowdown steps between the higher and lower pressures and intermediate blowdown pressure levels therebetween, a purge step at the lower pressure, and a plurality of pressurization steps between the lower and the higher pressures and intermediate pressurization pressure levels therebetween. The number of angularly spaced adsorber elements is greater than, and preferably at least twice the number of steps of the PSA cycle; so that several and typically at least two angularly spaced adsorber elements are open to each compartment and the corresponding process step at any time. The number of adsorber elements should exceed the total number of compartments in the first and second valve faces combined.

During the pressurization steps for each adsorber, either (or both) of the first or second apertures of an adsorber already at a pressure is (are) opened respectively to a first or second pressurization compartment at a stepwise higher pressure. Equalization then takes place by flow through the open aperture(s) from the pressurization compartment into the adsorber, which by the end of the pressurization step has attained approximately the same pressure as the pressurization compartment(s). Each pressurization compartment is in communication with typically several adsorbers being pressurized (in differing angular and time phase) at any given time, so the pressure in that compartment and the pressurization flow to that compartment are substantially steady.

During the blowdown steps for each adsorber, either (or both) of the first or second apertures of an adsorber already at a pressure is (are) opened respectively to a first or second blowdown compartment at a stepwise lower pressure. Equalization then takes place by flow through the open apertures(s) from the adsorber into the blowdown compartment, which by the end of the blowdown step has dropped to approximately the same pressure as the blowdown compartment(s). Each blowdown compartment is in communication with typically several adsorbers undergoing blowdown (in differing angular and time phase) at any given time, so the pressure in that compartment and the blowdown flow from that compartment are substantially steady.

The blowdown compartments include a plurality of light reflux exit compartments or cocurrent blowdown compartments opening to angular sectors of the second valve surface, and a plurality of countercurrent blowdown compartments opening to angular sectors of the first valve surface. Preferably, the angular phase of the blowdown compartments is such that an adsorber element being depressurized from the higher pressure is depressurized initially from its second end to light reflux exit compartments, and then later from its first end to countercurrent blowdown compartments as the lower pressure is approached stepwise. The final blowdown step takes place into the first product compartment.

The pressurization compartments include a plurality of light reflux return compartments opening to angular sectors of the second valve surface, and may include one or more feed pressurization compartments opening to angular sectors of the first valve surface phased ahead of the feed step at the higher pressure. Preferably, the angular phase of the pressurization compartments is such that an adsorber element being pressurized from the lower pressure is pressurized initially from its second end from the light reflux return compartments, and then later from its first end from any feed pressurization compartments as the higher pressure is approached stepwise. The final pressurization step takes place from the first feed supply compartment.

Some blowdown steps may be performed simultaneously if desired from both ends of the adsorber elements, by opening the first and second orifices to blowdown compartments simultaneously. Likewise, some pressurization steps may be performed simultaneously if desired from both ends of the adsorber elements, by opening the first and second orifices to pressurization compartments simultaneously. The intermediate pressure levels of the first and second compartments may be approximately the same, but need not be the same.

Sealing means are provided in the first and second valve surfaces of the stator so as to limit gas leakage from and between the compartments. The seals may take the form of sealing strips extending axially to contact the rotor between the compartments, and circumferential seals at the ends of the rotor to prevent external leakage.

The pressure variation waveform in each adsorber would be a rectangular staircase if there were no throttling in the first and second apertures, but the apertures are orifices are sized to smooth the transients in gentle equalizations. In order to provide uniform flow through the adsorbers, all of the first apertures must be closely identical to each other, and all of the second apertures must be closely identical to each other.

The rate of pressure change in the adsorber element during blowdown and pressurization steps is limited by flow restriction across the first and second apertures, so that the maximum rate of pressure change during those steps is preferably much less than approximately five times the average rate of pressure change during those steps. This flow restriction may take place by sizing the apertures as restrictive orifices, and/or by throttling through gradual opening of the apertures by each sealing strip. The sealing strips may be configured, for example by providing tapered throttling slits or notches on their trailing edge, so as to provide slow opening and rapid closing of the apertures into each compartment.

Since the first and second compartments are external to the valving function of the apertures, and thus do not contribute to dead volume of the adsorbers, their volumes should be generously proportioned to ensure uniform flow distribution through the compartments and to or from the open apertures. Likewise, the enveloping surface defined by the second ends of the adsorbers conforms very closely to the second valve surface. This aspect of the invention is crucially important in removing the normal difficulties of degraded flow distribution and increased adsorber vessel dead volume as PSA systems are scaled up. The present invention facilitates scale-up in module size, as well as high frequency operation. The invention solves inherent difficulties of flow distribution and excessive dead volume that have inhibited scale-up of high frequency PSA devices.

In contrast to prior art PSA devices whose pressure vessels are subject to pressure cycling and consequent fatigue loading, the pressure vessel of the present invention operates under substantially static stresses, because each of the compartments operates under steady pressure conditions. Mechanical stresses on the rotor and its bearings are relatively small, because only small frictional pressure drops (at most equal to the interval between adjacent intermediate pressures) apply in the flow direction, while transverse pressure gradients between the adsorber elements are also small owing to the large number of elements. These features are important, since pressure vessel fatigue is a major concern and limitation in the design of PSA systems, especially working with corrosive gases or hydrogen at higher pressure or higher cycle frequency.

Preferably the adsorbent beds are configured for radial flow, with the first direction preferably radially inward when the less strongly adsorbed gas fraction has higher density that the more strongly adsorbed fraction, and the first direction preferably radially outward when the less strongly adsorbed gas fraction has lower density that the more strongly adsorbed fraction.

Hence, for hydrogen purification the feed gas would preferably be admitted to a first end of each bed at an outer radius, while the hydrogen as first product gas is delivered from a second end of each bed at an inner radius, and the higher molecular weight impurity fraction as second product is exhausted from the first end of the beds.

The adsorbent bed rotor rotates within a housing. Preferably, the rotor is configured as a circular cylindrical annular shell. The adsorbent beds are configured for radial flow, and are provided either as discrete cells or longitudinal staves within the rotor shell. As the adsorbent beds are mounted at a finite radius from the axis of revolution, they are subjected to centripetal acceleration.

Alternatively, the flow path within the adsorbers may be aligned for axial flow parallel to the rotor axis, so the first and second valve surfaces may be flat face valve surfaces orthogonal to the rotor axis. Alternatively, the flow path in the adsorbers may be inclined obliquely to the rotor axis, and the valve surfaces may be conical or other figures of revolution about the rotor axis.

The apparatus includes a rotary adsorbent bed assembly, in which a cooperating set of "N" adsorbent beds are contained in an adsorbent bed rotor revolving at exactly the cycle frequency or at the cycle frequency divided by an integer "M". The feed, blowdown, exhaust and pressurization compartments for a single cycle of the process extend over an arc of 360°/M in the stator about the axis of revolution. In the embodiments to be illustrated below, M=1 so that the compartments for a single cycle extend around the full circumference of 360°, and the rotor revolves at exactly the cycle frequency. However, the invention may also be applied with M>1, in which case the cycle frequency is M times the rotational frequency, and the full set of compartments for each cycle is repeated for each arc of 360°/M so that for each process step there are M compartments at equal angular spacings separated by 360°/M. For M=1, the duration of each step of the PSA process of the invention cycle is a larger time than the quotient T/N where "T" is the cycle period, and preferably at least twice the quotient T/N so that at least two adsorbers are undergoing each step simultaneously. Hence, the external flows to each step are substantially uniform in flow rate and pressure.

The present invention includes the alternatives of (1) layered or laminated thin sheet adsorbers and (2) the centrifugally clamped and stabilized fine particle granular adsorbers to enable operation at exceptionally high cycle frequency. PSA cycle frequencies in the range of 100 cycles per minute to at least 300 cycles per minute are considered to be practicable within the present invention, and will enable process intensification so that high productivity can be realized from compact modules. Cycle frequencies more rapid than about 100 cycles per minute will be achieved preferably with the layered thin sheet adsorbers, with the flow path in flow channels tangential to and between adjacent pairs of adsorbent loaded sheets, to obtain lower frictional pressure drop at high frequency than granular adsorbent.

When using granular adsorbent, it is a preferred aspect of the invention that the angular velocity of the rotor be high enough so that the centripetal acceleration is a large multiple of the earth's acceleration of gravity. The hydrostatic pressure gradient due to centripetal acceleration (outward radial compression stress) within the adsorbent bed will be much greater than the maximum inward pressure gradient due to the flow friction of gas flow from the first end to the second end of the adsorbent beds. The adsorbent beds are supported at their first end (radially outside) by a first set of screens, and retained against collapsing when the rotor is stopped by a second set of screens at their second end (radially inside).

Hence, the adsorbent beds are centrifugally clamped on the first screens by centripetal acceleration with the rotor acting as a centrifuge. This centrifugal clamping is much stronger than the ordinary weight of adsorbent in conventional stationary vertical towers, and thus overcomes the limitation of conventional PSA systems to relatively modest upflow gas velocities to avoid incipient fluidization and bed movement causing attritional loss and dusting of the adsorbent.

The centrifugal clamping aspect of the present invention allows operation of granular adsorbent beds with much higher than conventional flow friction pressure gradients while still positively preventing any particle movement and attrition. In turn, this allows use of smaller adsorbent grain sizes, also enabling a very shallow radial bed depth. With the small adsorbent granule size reducing the mass transfer diffusional resistance, high PSA cycle frequencies become practicable. Closing the logical argument, high cycle frequencies correspond to the high rotational speed needed for centrifugal clamping.

While the use of rotating granular adsorbent beds in radial flow configurations is well known in the above cited prior art, high frequency operating conditions that would create a useful centripetal acceleration much greater than the acceleration for gravity have not been disclosed. Thus, Boudet et al in U.S. Pat. No. 5,133,784 contemplate a maximum cycle frequency and rotor speed of 20 RPM, which with their mentioned rotor outer radius of 1 metre would provide a maximum centripetal acceleration of approximately 4.4 m/s$^2$, or less than half the acceleration of gravity (9.8 m/s$^2$) at the outer radius. The adsorbent beds, within the rotor and closer to the axis, are subject to an even smaller centripetal acceleration.

This centrifugal clamping effect of high centripetal acceleration will improve bed packing uniformity with small granular particle sizes, so as to reduce axial dispersion and thus also reduce both the necessary radial bed length. With a shorter bed length, operating pressure drops due to flow friction are also reduced. Much smaller particle sizes can be used with good performance. In the typical case of macropore diffusional control of mass transfer resistance, the practicable cycle frequency can be increased in approximate inverse proportion to the square of particle diameter being reduced. Hence, in the case of air separation over nitrogen-selective zeolites, a cycle frequency of 75 cycles/minute should yield good performance with a particle diameter of about 250 microns.

The present invention prefers that the centripetal acceleration at the radius of the adsorbent beds be at least 5 times the acceleration of gravity, and preferably at least 10 times the acceleration of gravity. Centripetal acceleration at a radial distance from the axis of rotation is defined as the square of rotational angular frequency times that radius.

A further most important benefit of the invention arises in purification of very low molecular weight gases such as hydrogen and helium to remove higher molecular weight impurities. Here, the light product is separated radially inward, while the heavy impurities are separated radially outward by the centrifugal PSA apparatus of the present invention. In all PSA systems, dispersive effects including axial dispersion, uneven bed packing, thermal gradients and wall flow channelling all tend to spread the concentration gradient in the bed so as to degrade separation performance. But the strong centripetal acceleration field of the present invention will induce a buoyant stratification of the purified light fraction radially inward of the separated heavy fraction, thus opposing dispersive effects and enhancing separation performance. This important desirable effect is present whether granular adsorbent or laminated sheet supported adsorbent is used, as long as the flow direction in the adsorbent bed is radially inward from the first end to the second end of the bed.

In air separation with the feed presented to the outer radius of the adsorbers, the buoyancy effect due to the greater molecular weight of oxygen compared to nitrogen would be modestly adverse. The molecular weight difference between hydrogen and its impurities (other than helium) is far greater and in the desired direction. Some process embodiments of the present invention include the feature of heating the oxygen light reflux gas, for the main objects of thermally enhancing expansion energy recovery, improving adsorption/desorption kinetics, and shifting the optimal operating pressure range from vacuum to positive superatmospheric pressure conditions. Heating the light reflux oxygen sufficiently will create a radial thermal gradient, so that the second end of the adsorbers (at an inner radius) will be hotter than the first end of the adsorbers (at an outer radius). In a rapidly rotating rotor of the invention, this thermal gradient will enhance the convective stability of the mass transfer front in the adsorbers, and will tend to compensate the adverse effect of oxygen being more dense than nitrogen at equal temperature. The present invention thus can provide radial stabilization of the mass transfer front by establishing a radial density gradient either of lower molecular weight of the gas contacting the adsorbent radially inward, or by a thermal gradient of higher temperature radially inward.

Alternatively, convective stability in air separation applications may be enhanced by operating with the feed applied to an inner radius of radial flow rotating adsorbers, while the oxygen as second product is withdrawn from an outer radius.

The principle of using compression and expansion machinery (with compression performed predominantly in communication with the first ends of the adsorbers, and expansion energy recovery performed on cocurrent blowdown from the second ends of the adsorbers) to generate a high performance PSA cycle is referred to as "Thermally Coupled Pressure Swing Adsorption" or TCPSA, because of the inherent heat pumping aspect resulting from a close mechanical analogy to Stirling or Ericsson cycle thermodynamic engines.

Energy recovery is performed by expansion of countercurrent blowdown gas (when those steps are performed at superatmospheric pressure), and by expansion over the pressure letdown expanders between the light reflux exit and return compartments. Heat exchangers are optionally provided as compression intercoolers to reject heat of compression, and as heaters to heat either (or both) the countercurrent blowdown gas or the light reflux gas about to be expanded. The heater may be provided with heat from an external source, or may use heat of compression from the compression intercoolers as another mode of energy recovery within the apparatus and process of the invention.

By providing multiple closely spaced intermediate pressure levels, with substantially constant flow and pressure at each level, the present invention facilitates energy efficient application of multistage feed compressors and vacuum pumps (including centrifugal or axial compression machines) for feed compression, heavy product exhaust and heavy reflux compression; as well as multistage expanders (including radial inflow turbines, axial turbines and partial admission impulse turbines). Positive displacement (reciprocating piston, rotary piston, or progressive cavity such as screw or scroll machines) compression and expansion machinery may also be applied within the scope of the invention, particularly when adapted to deliver gas at multiple intermediate delivery pressures and/or to intake gas at multiple intermediate inlet pressures. The invention enables use of single shaft machines to provide all compression and expansion functions for a plurality of modules in parallel, as well as the combined use of motor driven and free rotor machines for more flexible modularization and splitting of stages.

An important aspect of the invention is the elimination of dead volume associated with flow distribution manifolds, since the orifices providing valving action are immediately adjacent to the ends of the flow path through the adsorber elements. In the present invention, the valve surfaces are placed in the closest possible approach to the envelope surface defined by the adsorber element ends corresponding to that valve surface.

MODES FOR CARRYING OUT THE INVENTION

FIGS. 1, 2, 3 and 4

Figure 1:
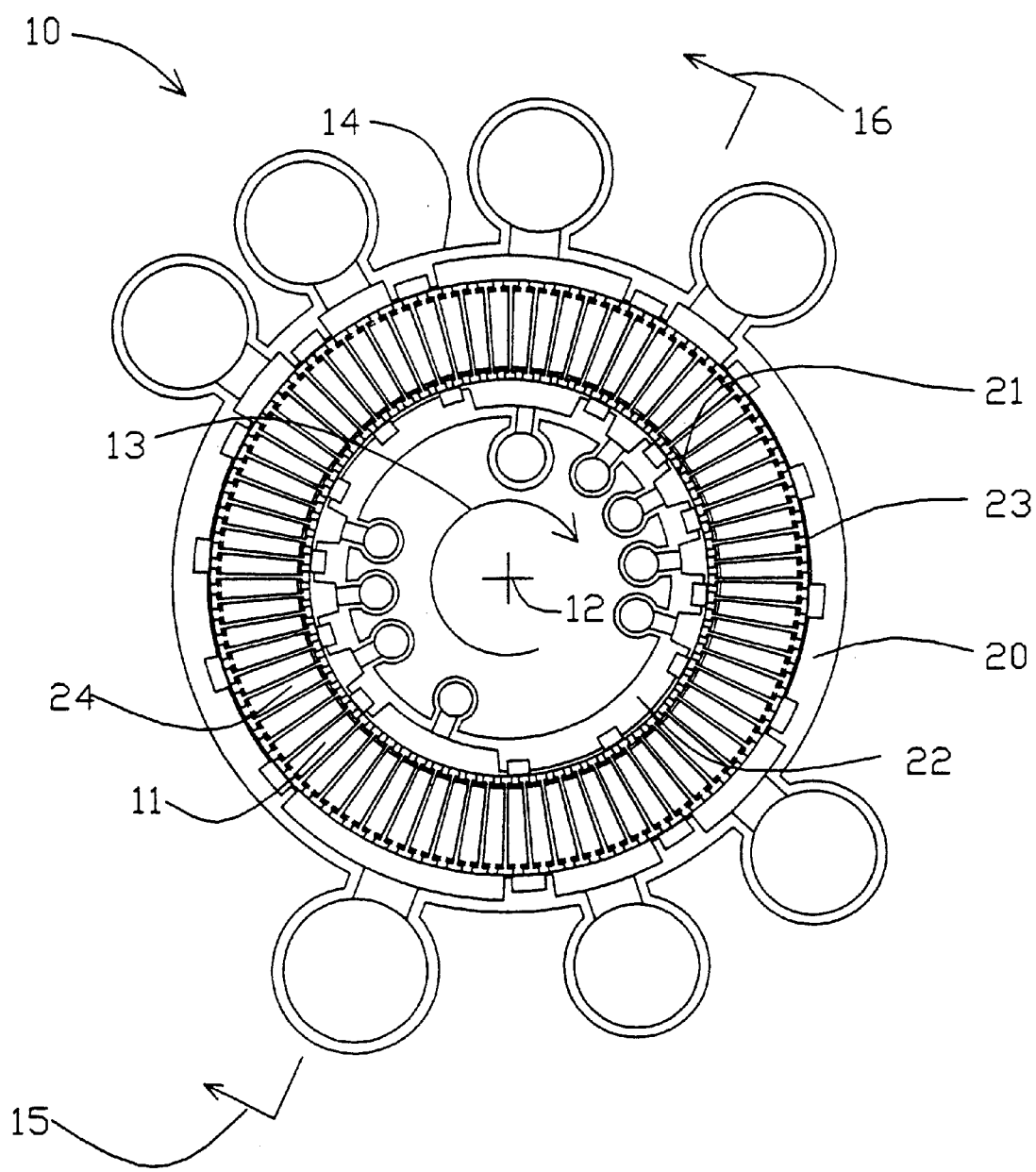
FIG. 1 is a sectional view of a rotary PSA module according to the invention.
Figure 2:
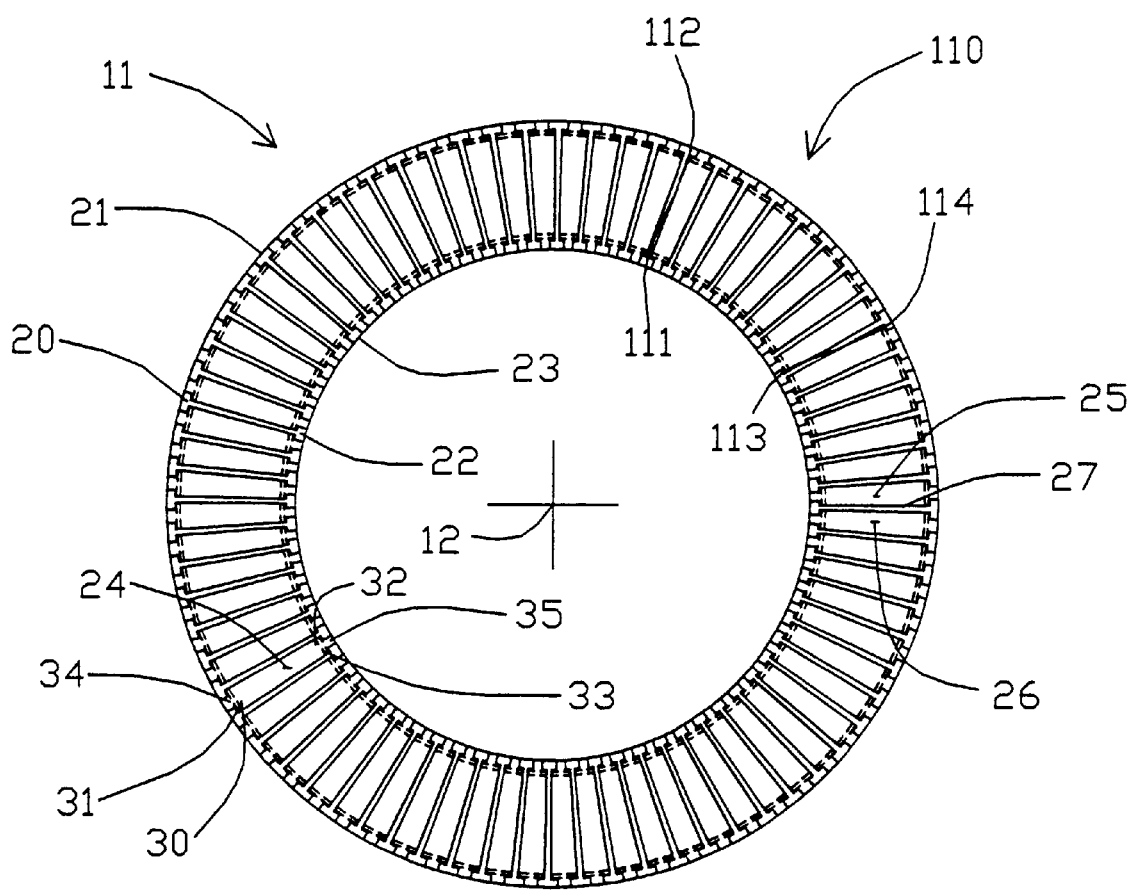
FIG. 2 is the stator of the module of FIG. 1.
Figure 3:
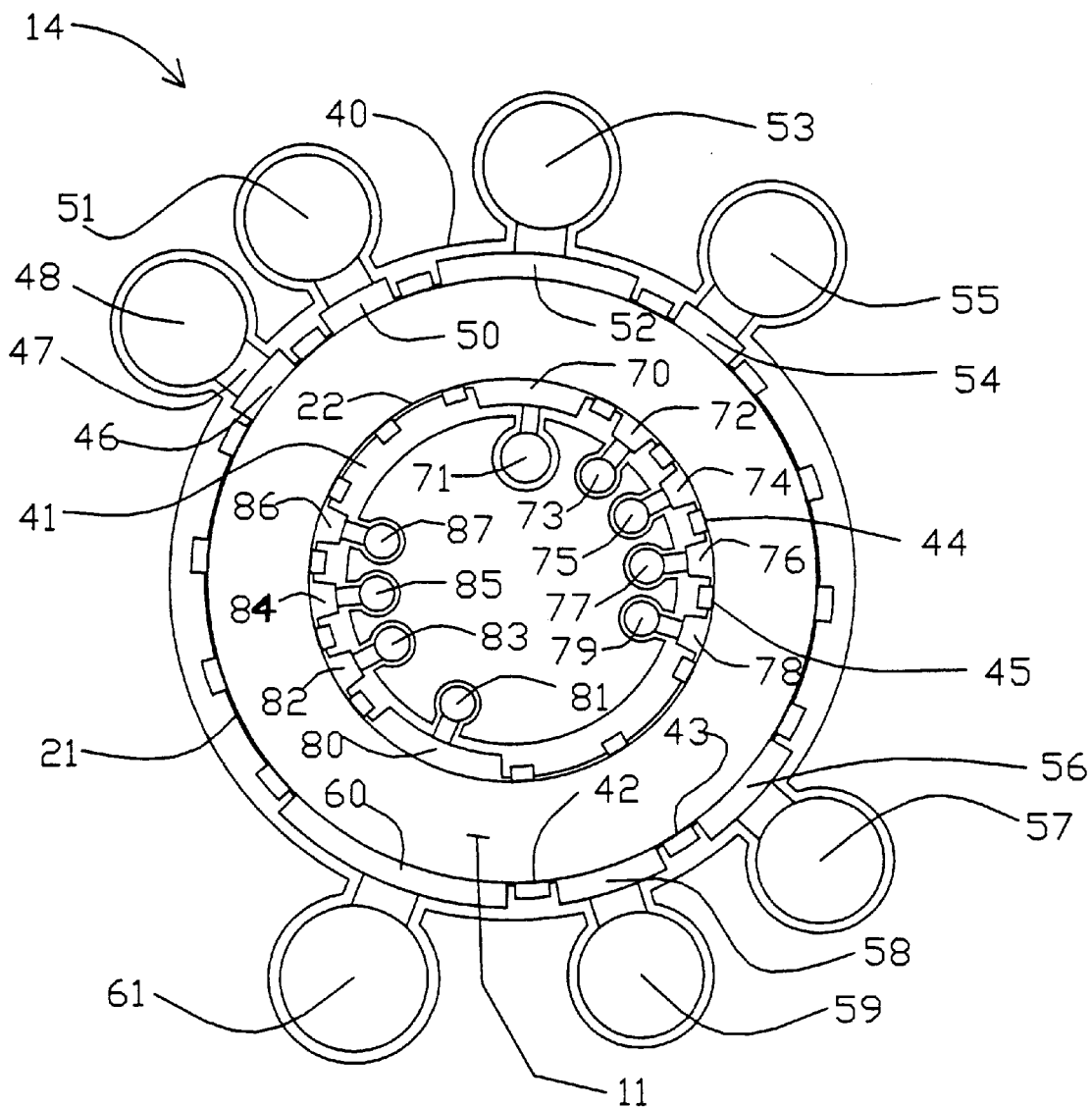
FIG. 3 is the rotor of the module of FIG. 1.
Figure 4:
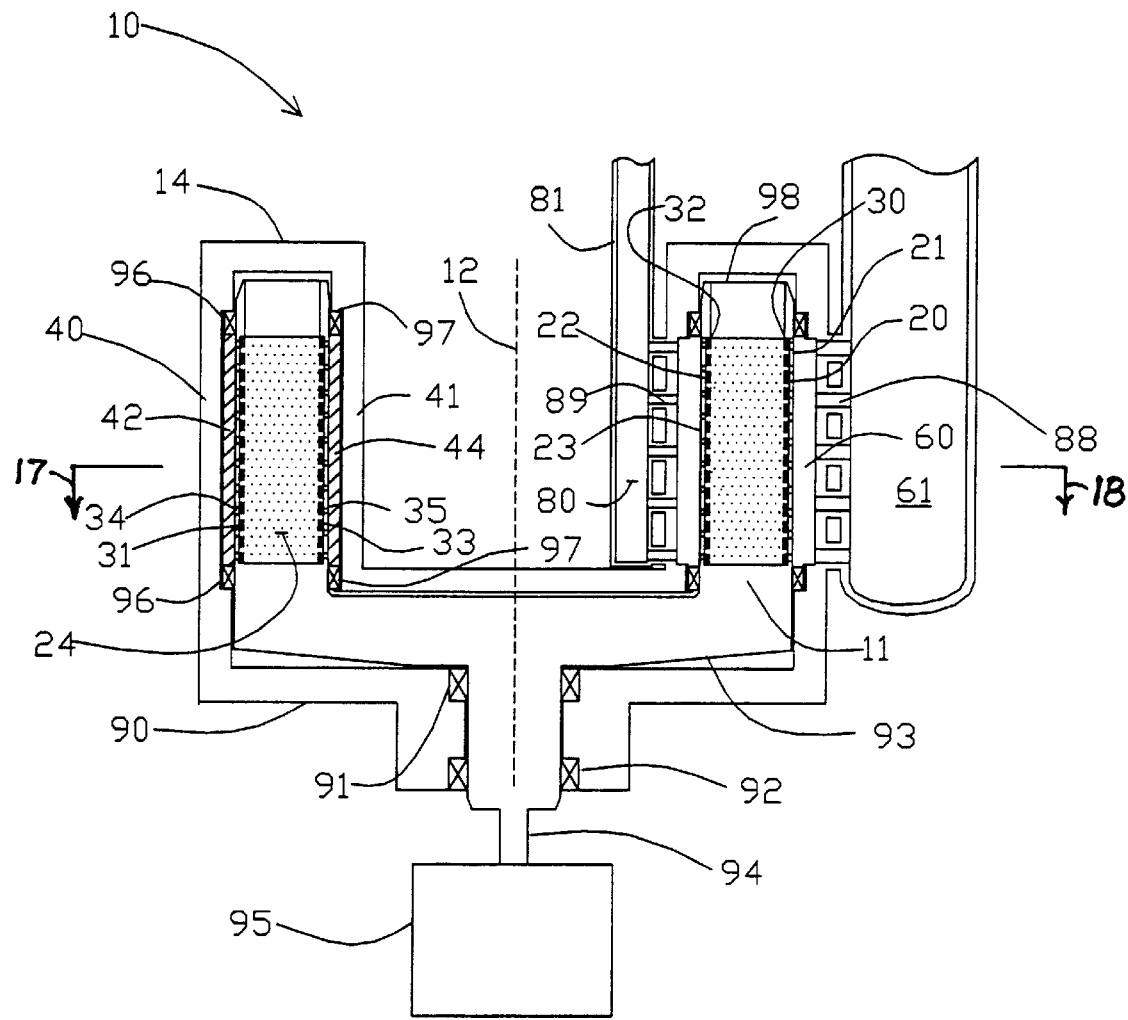
FIG. 4 is an axial section of the module of FIG. 1.

A module 10 according to the invention is shown in FIGS. 1, 2, 3 and 4. The module includes a rotor 11 revolving about axis 12 in the direction shown by arrow 13 within stator 14. FIG. 4 is an axial section of the module 10, defined by arrows 15 and 16 in FIG. 1. FIG. 1 is a cross-section of the module 10, defined by arrows 17 and 18 in FIG. 4. FIG. 2 is the sectional view of the rotor 11 repeated from FIG. 1, with the stator deleted for clarity. FIG. 3 is the sectional view of the stator 14 repeated from FIG. 1, with details of the rotor deleted for clarity.

In general, the apparatus of the invention may be configured for flow through the adsorber elements in the radial, axial or oblique conical directions relative to the rotor axis. For operation at high cycle frequency, radial flow is preferred, as expressed in the embodiment of module 10, so that the centripetal acceleration will lie parallel to the flow path for most favourable stabilization of buoyancy-driven free convection, as well as centrifugal clamping of granular adsorbent with uniform flow distribution.

As shown in FIG. 2, the rotor 11 is of annular section, having concentrically to axis 12 an outer cylindrical wall 20 whose external surface is first valve surface 21, and an inner cylindrical wall 22 whose internal surface is second valve surface 23. The rotor has (in the plane of the section defined by arrows 15 and 16 in FIG. 4) a total of "N" radial flow adsorber elements 24. An adjacent pair of adsorber elements 25 and 26 are separated by partition 27 which is structurally and sealingly joined to outer wall 20 and inner wall 22. Adjacent adsorber elements 25 and 26 are angularly spaced relative to axis 12 by an angle of [360°/N].

Adsorber element 24 has a first end 30 defined by support screen 31 and a second end 32 defined by support screen 33. The adsorber may be provided as granular adsorbent, whose packing voidage defines a flow path contacting the adsorbent between the first and second ends of the adsorber.

First aperture or orifice 34 provides flow communication from first valve surface 21 through wall 20 to the first end 30 of adsorber 24. Second aperture or orifice 35 provides flow communication from second valve surface 23 through wall 22 to the second end 32 of adsorber 24. Support screens 31 and 33 respectively provide flow distribution between first aperture 34 and first end 30, and between second aperture 35 and second end 32, of adsorber element 224. Support screen 31 also supports the centrifugal force loading of the adsorbent.

As shown in FIG. 3, stator 14 is a pressure housing including an outer cylindrical shell 40 outside the annular rotor 11, and an inner cylindrical shell 41 inside the annular rotor 11. Outer shell 40 carries axially extending strip seals (e.g. 42 and 43) sealingly engaged with first valve surface 21, while inner shell 41 carries axially extending strip seals (e.g. 44 and 45) sealingly engaged with second valve surface 23. The azimuthal sealing width of the strip seals is greater than the diameters or azimuthal widths of the first and second apertures 34 and 35 opening through the first and second valve surfaces.

A set of first compartments in the outer shell each open in an angular sector to the first valve surface, and each provide fluid communication between its angular sector of the first valve surface and a manifold external to the module. The angular sectors of the compartments are much wider than the angular separation of the adsorber elements. The first compartments are separated on the first sealing surface by the strip seals (e.g. 42). Proceeding clockwise in FIG. 3, in the direction of rotor rotation, a first feed pressurization compartment 46 communicates by conduit 47 to first feed pressurization manifold 48, which is maintained at a first intermediate feed pressure. Similarly, a second feed pressurization compartment 50 communicates to second feed pressurization manifold 51, which is maintained at a second intermediate feed pressure higher than the first intermediate feed pressure but less than the higher working pressure.

For greater generality, module 10 is shown with provision for sequential admission of two feed mixtures, the first feed gas having a lower concentration of the more readily adsorbed component relative to the second feed gas. First feed compartment 52 communicates to first feed manifold 53, which is maintained at substantially the higher working pressure. Likewise, second feed compartment 54 communicates to second feed manifold 55, which is maintained at substantially the higher working pressure.

A first countercurrent blowdown compartment 56 communicates to first countercurrent blowdown manifold 57, which is maintained at a first countercurrent blowdown intermediate pressure. A second countercurrent blowdown compartment 58 communicates to second countercurrent blowdown manifold 59, which is maintained at a second countercurrent blowdown intermediate pressure above the lower working pressure. A heavy product compartment 60 communicates to heavy product exhaust manifold 61 which is maintained at substantially the lower working pressure. It will be noted that compartment 58 is bounded by strip seals 42 and 43, and similarly all the compartments are bounded and mutually isolated by strip seals.

A set of second compartments in the inner shell each open in an angular sector to the second valve surface, and each provide fluid communication between its angular sector of the second valve surface and a manifold external to the module. The second compartments are separated on the second sealing surface by the strip seals (e.g. 44). Proceeding clockwise in FIG. 3, again in the direction of rotor rotation, light product compartment 70 communicates to light product manifold 71, and receives light product gas at substantially the higher working pressure, less frictional pressure drops through the adsorbers and the first and second orifices. According to the angular extension of compartment 70 relative to compartments 52 and 54, the light product may be obtained only from adsorbers simultaneously receiving the first feed gas from compartment 52, or from adsorbers receiving both the first and second feed gases.

A first light reflux exit compartment 72 communicates to first light reflux exit manifold 73, which is maintained at a first light reflux exit pressure, here substantially the higher working pressure less frictional pressure drops. A first cocurrent blowdown compartment 74 (which is actually the second light reflux exit compartment), communicates to second light reflux exit manifold 75, which is maintained at a first cocurrent blowdown pressure less than the higher working pressure. A second cocurrent blowdown compartment or third light reflux exit compartment 76 communicates to third light reflux exit manifold 77, which is maintained at a second cocurrent blowdown pressure less than the first cocurrent blowdown pressure. A third cocurrent blowdown compartment or fourth light reflux exit compartment 78 communicates to fourth light reflux exit manifold 79, which is maintained at a third cocurrent blowdown pressure less than the second cocurrent blowdown pressure.

A purge compartment 80 communicates to a fourth light reflux return manifold 81, which supplies the fourth light reflux gas which has been expanded from the third cocurrent blowdown pressure to substantially the lower working pressure with an allowance for frictional pressure drops. The ordering of light reflux pressurization steps is inverted from the ordering or light reflux exit or cocurrent blowdown steps, so as to maintain a desirable "last out—first in" stratification of light reflux gas packets. Hence a first light reflux pressurization compartment 82 communicates to a third light reflux return manifold 83, which supplies the third light reflux gas which has been expanded from the second cocurrent blowdown pressure to a first light reflux pressurization pressure greater than the lower working pressure. A second light reflux pressurization compartment 84 communicates to a second light reflux return manifold 85, which supplies the second light reflux gas which has been expanded from the first cocurrent blowdown pressure to a second light reflux pressurization pressure greater than the first light reflux pressurization pressure. Finally, a third light reflux pressurization compartment 86 communicates to a first light reflux return manifold 87, which supplies the first light ref lux gas which has been expanded from approximately the higher pressure to a third light reflux pressurization pressure greater than the second light reflux pressurization pressure, and in this example less than the first feed pressurization pressure.

Additional details are shown in FIG. 4. Conduits 88 connect first compartment 60 to manifold 61, with multiple conduits providing for good axial flow distribution in compartment 60. Similarly, conduits 89 connect second compartment 80 to manifold 81.

Stator 14 has base 90 with bearings 91 and 92. The annular rotor 11 is supported on end disc 93, whose shaft 94 is supported by bearings 91 and 92. Motor 95 is coupled to shaft 94 to drive rotor 11. The rotor could alternatively rotate as an annular drum, supported by rollers at several angular positions about its rim and also driven at its rim so that no shaft would be required. A rim drive could be provided by a ring gear attached to the rotor, or by a linear electromagnetic motor whose stator would engage an arc of the rim.

Outer circumferential seals 96 seal the ends of outer strip seals 42 and the edges of first valve surface 21, while inner circumferential seals 97 seal the ends of inner strip seals 44 and the edges of second valve surface 23.

Rotor 11 has access plug 98 between outer wall 20 and inner wall 22, which provides access for installation and removal of the adsorbent in adsorbers 24.

Figure 8:
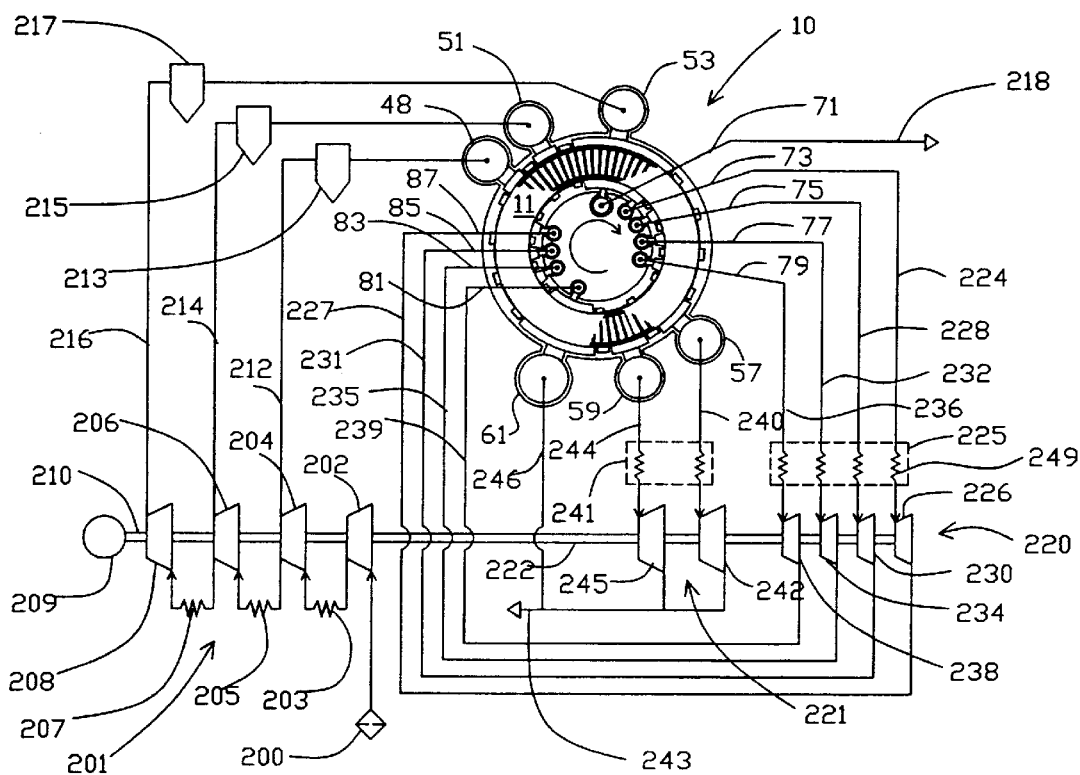
FIG. 8 shows a PSA apparatus with a single rotary module and energy recovery.

The schematic of FIG. 8 shows a single shaft supporting the compressor stages, the countercurrent blowdown or exhaust expander stages, and the light reflux stages, as well as coupling the compressor to the prime mover. However, it should be understood that separate shafts and even separate prime movers may be used for the distinct compression and expansion stages within the scope of the present invention.

It should also be understood that the number of compression stages and the number of expansion stages (as well as the number of vacuum pump stages in the embodiment of FIG. 9 below) may be varied within the scope of the invention. Generally and for equal stage efficiency of the compressor or expander type chosen, a larger number of stages will improve the PSA process efficiency, since the irreversible equalization expansions over the first and second orifices will be performed over narrower pressure intervals. However, the improvement in efficiency for each additional stage will diminish as the number of stages is greater.

FIG. 5

An attractive alternative to the use of granular adsorbent is obtained by forming the adsorbent material with a suitable reinforcement matrix into thin adsorbent sheets, and layering the adsorbent sheets with spacers to form a layered sheet contactor with flow channels between adjacent pairs of sheets. The adsorber elements may then be installed as angularly spaced rectangular blocks within the rotor and between the first and second valve faces, with the adsorbent sheets as substantially flat sheets extending parallel to the plane defined by the axis of the rotor and a radius from the axis through the rectangular block, and the flat adsorbent sheets being layered with flow channels between them to form the rectangular block. The flow channels also lie in planes parallel to the sheets and to the plane defined by the axis of the rotor and a radius from the axis through the rectangular blocks, and may be configured for either axial flow of radial flow. In the axial flow case, the first and second valve surfaces would be provided as flat discs perpendicular to and concentric with the axis of rotation. In the radial flow case, represented by FIGS. 1–4, the first and second valve surfaces are provided as inner and outer cylindrical surfaces bounding the annular rotor within which the adsorber elements are mounted.

Figure 5:
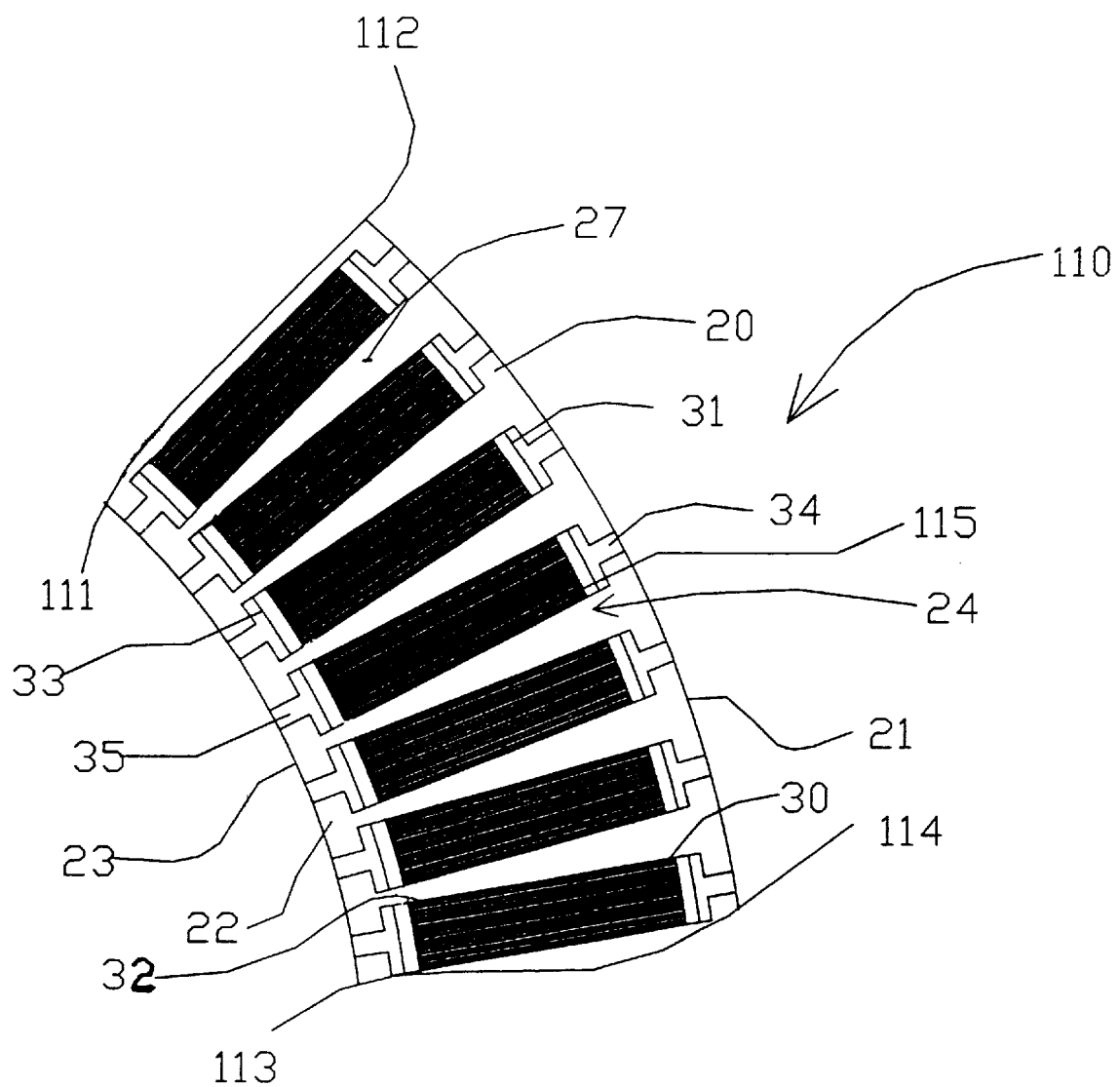
FIG. 5 shows an alternative adsorber configuration using layered adsorbent sheets.

A section 110 of rotor 11 has been identified in FIG. 2 between the curved lines with endpoints 111 and 112, and 113 and 114. FIG. 5 shows section 110 in detail, with the laminated sheet embodiment of the adsorbers.

The laminate sheets 115 lie in the radial plane and are layered to form the adsorber elements 24 as rectangular blocks. Each sheet 115 comprises reinforcement material, e.g. a glass fiber or metal wire matrix (woven or non-woven) on which the adsorbent material (e.g. zeolite crystallites is supported by a suitable binder (e.g., clay, silicate or coke binders). Typical thickness of an adsorbent sheet may be about 100 microns. The sheets 115 are installed with pacers on one or both sides to establish flow channels between adjacent pairs of sheets. The flow channels define he flow path approximately in the radial direction between first end 30 and second end 32 of the flow path in each adsorber element. Typical channel height would be about half the adsorbent sheet thickness, e.g. about 50 microns.

Figure 6:
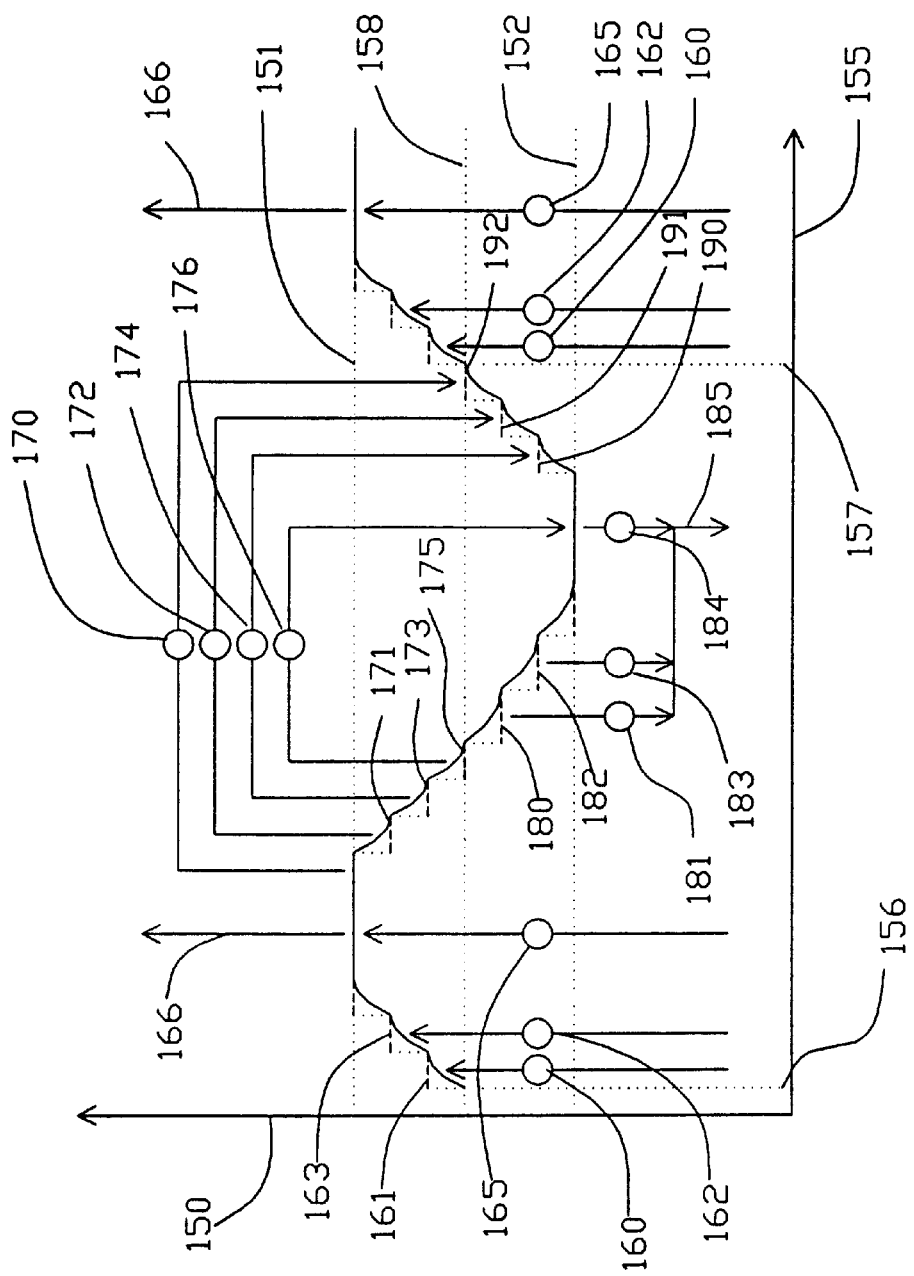
FIG. 6 shows a typical PSA cycle according to the invention.
Figure 7:
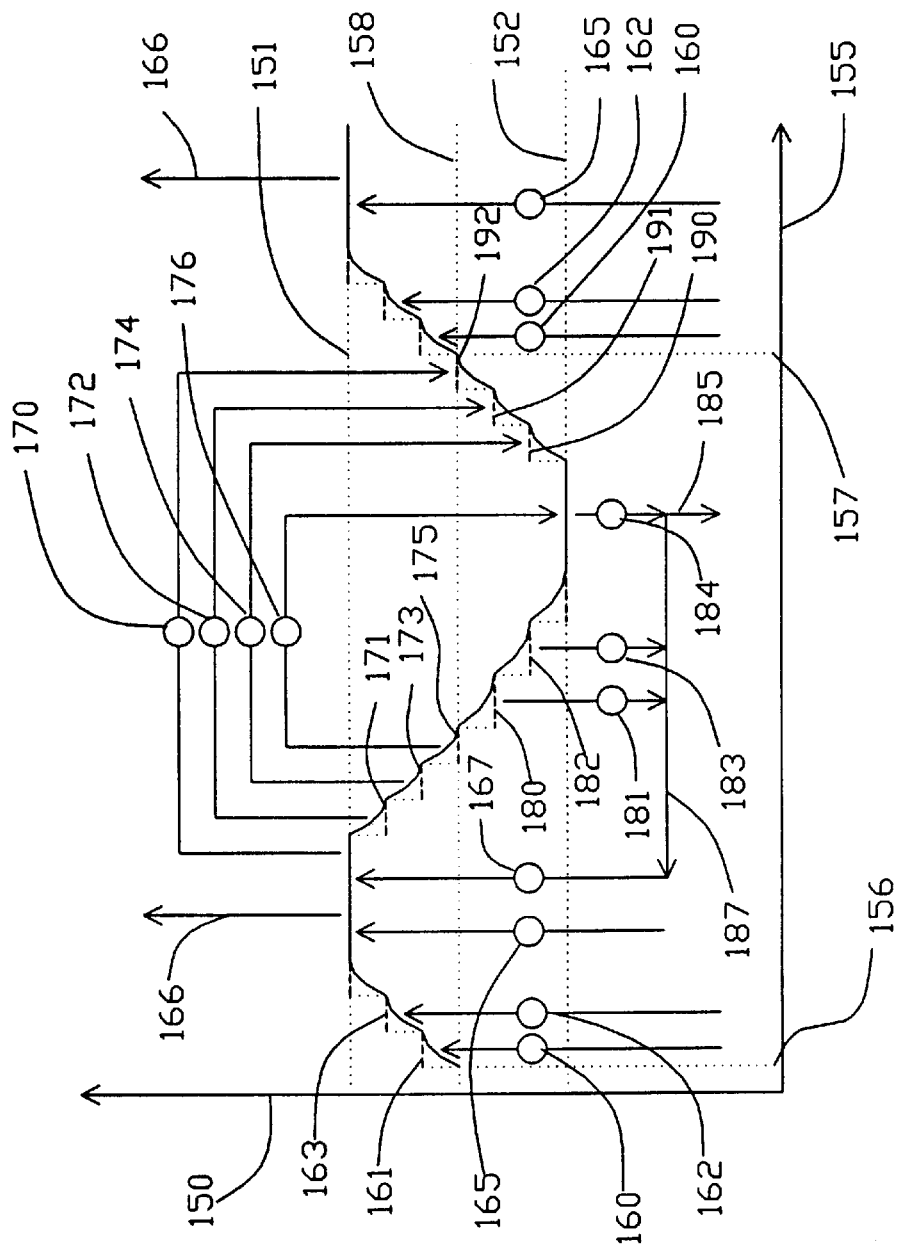
FIG. 7 shows a PSA cycle with heavy reflux.

FIGS. 6 and 7

FIG. 6 shows a typical PSA cycle according to the invention, while FIG. 7 shows a similar PSA cycle with heavy reflux recompression of a portion of the first product gas to provide a second feed gas to the process.

In FIGS. 6 and 7, the vertical axis 150 indicates the working pressure in the adsorbers and the pressures in the first and second compartments. Pressure drops due to flow within the adsorber elements are neglected. The higher and lower working pressures are respectively indicated by dotted lines 151 and 152.

The horizontal axis 155 of FIGS. 6 and 7 indicates time, with the PSA cycle period defined by the time interval between points 156 and 157. At times 156 and 157, the working pressure in a particular adsorber is pressure 158. Starting from time 156, the cycle for a particular adsorber (e.g. 24) begins as the first aperture 34 of that adsorber is opened to the first feed pressurization compartment 46, which is fed by first feed supply means 160 at the first intermediate feed pressure 161. The pressure in that adsorber rises from pressure 158 at time 157 to the first intermediate feed pressure 161. Proceeding ahead, first aperture passes over a seal strip, first closing adsorber 24 to compartment 46 and then opening it to second feed pressurization compartment 50 which is fed by second feed supply means 162 at the second intermediate feed pressure 163. The adsorber pressure rises to the second intermediate feed pressure.

First aperture 34 of adsorber 24 is opened next to first feed compartment 52, which is maintained at substantially the higher pressure by a third feed supply means 165. Once the adsorber pressure has risen to substantially the higher working pressure, its second aperture 35 (which has been closed to all second compartments since time 156) opens to light product compartment 70 and delivers light product 166.

In the cycle of FIG. 7, first aperture 34 of adsorber 24 is opened next to second feed compartment 54, also maintained at substantially the higher pressure by a fourth feed supply means 167. In general, the fourth feed supply means supplies a second feed gas, typically richer in the more readily adsorbed component than the first feed gas provided by the first, second and third feed supply means. In the specific cycle illustrated in FIG. 7, the fourth feed supply means 167 is a "heavy reflux" compressor, recompressing a portion of the heavy product back into the apparatus. In the cycle illustrated in FIG. 6, there is no fourth feed supply means, and compartment 54 could be eliminated or consolidated with compartment 52 extended over a wider angular arc of the stator.

While feed gas is still being supplied to the first end of adsorber 24 from either compartment 52 or 54, the second end of adsorber 24 is closed to light product compartment 70 and opens to first light reflux exit compartment 72 while delivering "light reflux" gas (enriched in the less readily adsorbed component, similar to second product gas) to first light reflux pressure let-down means (or expander) 170. The first aperture 34 of adsorber 24 is then closed to all first compartments, while the second aperture 35 is opened successively to (a) second light reflux exit compartment 74, dropping the adsorber pressure to the first cocurrent blowdown pressure 171 while delivering light reflux gas to second light ref lux pressure letdown means 172, (b) third light reflux exit compartment 76, dropping the adsorber pressure to the second cocurrent blowdown pressure 173 while delivering light reflux gas to third light reflux pressure letdown means 174, and (c) fourth light reflux exit compartment 78, dropping the adsorber pressure to the third cocurrent blowdown pressure 175 while delivering light reflux gas to fourth light reflux pressure letdown means 176. Second aperture 35 is then closed for an interval, until the light reflux return steps following the countercurrent blowdown steps.

The light reflux pressure let-down means may be mechanical expanders or expansion stages for expansion energy recovery, or may be restrictor orifices or throttle valves for irreversible pressure let-down.

Either when the second aperture is closed after the final light reflux exit step (as shown in FIGS. 6 and 7), or earlier while light reflux exit steps are still underway, first aperture 34 is opened to first countercurrent blowdown compartment 56, dropping the adsorber pressure to the first countercurrent blowdown intermediate pressure 180 while releasing "heavy" gas (enriched in the more strongly adsorbed component) to first exhaust means 181. Then, first aperture 34 is opened to second countercurrent blowdown compartment 58, dropping the adsorber pressure to the first countercurrent blowdown intermediate pressure 182 while releasing heavy gas to second exhaust means 183. Finally reaching the lower working pressure, first aperture 34 is opened to heavy product compartment 60, dropping the adsorber pressure to the lower pressure 152 while releasing heavy gas to third exhaust means 184. Once the adsorber pressure has substantially reached the lower pressure while first aperture 34 is open to compartment 60, the second aperture 35 opens to purge compartment 80, which receives fourth light reflux gas from fourth light reflux pressure let-down means 176 in order to displace more heavy gas into first product compartment 60.

In FIG. 6, the heavy gas from the first, second and third exhaust means is delivered as the heavy product 185. In FIG. 7, this gas is partly released as the heavy product 185, while the balance is redirected as "heavy reflux" 187 to the heavy reflux compressor as fourth feed supply means 167. Just as light reflux enables an approach to high purity of the less readily adsorbed ("light") component in the light product, heavy reflux enables an approach to high purity of the more readily adsorbed ("heavy") component in the heavy product.

The adsorber is then repressurized by light reflux gas after the first and second apertures close to compartments 60 and 80. In succession, while the first aperture 34 remains closed at least initially, (a) the second aperture 35 is opened to first light reflux pressurization compartment 82 to raise the adsorber pressure to the first light reflux pressurization pressure 190 while receiving third light reflux gas from the third light reflux pressure letdown means 174, (b) the second aperture 35 is opened to second light reflux pressurization compartment 84 to raise the adsorber pressure to the second light reflux pressurization pressure 191 while receiving second light reflux gas from the second light reflux pressure letdown means 172, and (c) the second aperture 35 is opened to third light reflux pressurization compartment 86 to raise the adsorber pressure to the third light reflux pressurization pressure 192 while receiving first light reflux gas from the first light reflux pressure letdown means 170. Unless feed pressurization has already been started while light reflux return for light reflux pressurization is still underway, the process (as based on FIGS. 6 and 7) begins feed pressurization for the next cycle after time 157 as soon as the third light reflux pressurization step has been concluded.

The rate of pressure rise is restricted by the first and second apertures as orifices, as indicated by the pressure rise (decline) curve in each step. If the apertures were larger and thus less restrictive, the pressure would rise or drop more steeply to the pressure plateau in each step. With a less restrictive first aperture, the PSA cycle could be operated at higher cycle frequency between the same higher and lower pressures. Conversely, if the adsorber apertures were smaller and hence more restrictive, the pressure would change less rapidly, so that the process would have to be operated at lower frequency or over a narrower pressure range between higher and lower pressures. It is important that the apertures be correctly sized for operation at the maximum design condition of cycle frequency and specified higher and lower pressures, so that under the design condition the required pressure change for each step is achieved with the least steep initial rate. Alternatively, the apertures may be opened slowly by the seal strips, to provide flow restriction throttling between the apertures and the seal strips, which may have a serrated edge (e.g. with notches or tapered slits in the edge of the seal strip) so that the apertures are only opened to full flow gradually. Excessively rapid rates of pressure change would subject the adsorber to mechanical stress, while also causing flow transients which would tend to increase axial dispersion of the concentration wavefront in the adsorber.

FIG. 8

FIGS. 8–15 are simplified schematics of PSA systems using the module 10 of FIGS. 1–4 as the basic building block, and showing the connections from the first and second manifolds of the module to machinery for compression and expansion of gases in typical applications. In FIGS. 8–15, the reference numerals of the first and second manifolds are as defined for FIG. 3.

FIG. 8 is a simplified schematic of a PSA system for separating oxygen from air, using nitrogen-selective zeolite adsorbents. The light product is concentrated oxygen, while the heavy product is nitrogen-enriched air usually vented as waste. The cycle lower pressure 152 is nominally atmospheric pressure. Feed air is introduced through filter intake 200 to a feed compressor 201. The feed compressor includes compressor first stage 202, intercooler 203, compressor second stage 204, second intercooler 205, compressor third stage 206, third intercooler 207, and compressor fourth stage 208. The feed compressor 201 as described may be a four stage axial compressor or centrifugal compressor with motor 209 as prime mover coupled by shaft 210, and the intercoolers are optional. With reference to FIG. 6, the feed compressor first and second stages are the first feed supply means 160, delivering feed gas at the first intermediate feed pressure 161 via conduit 212 and water condensate separator 213 to first feed pressurization manifold 48. Feed compressor third stage 206 is the second feed supply means 162, delivering feed gas at the second intermediate feed pressure 163 via conduit 214 and water condensate separator 215 to second feed pressurization manifold 51. Feed compressor fourth stage 208 is the third feed supply means 165, delivering feed gas at the higher pressure 151 via conduit 216 and water condensate separator 217 to feed manifold 53. Light product oxygen flow is delivered from light product manifold 71 by conduit 218, maintained at substantially the higher pressure less frictional pressure drops.

The apparatus of FIG. 8 includes energy recovery expanders, including light reflux expander 220 (here including four stages) and countercurrent blowdown expander 221 (here including two stages), coupled to feed compressor 201 by shaft 222. The expander stages may be provided for example as radial inflow turbine stages, as full admission axial turbine stages with separate wheels, or as partial admission impulse turbine stages combined in a single wheel as illustrated in FIGS. 17–20 below.

Light reflux gas from first light reflux exit manifold 73 flows at the higher pressure via conduit 224 and heater 225 to first light pressure letdown means 170 which here is first light reflux expander stage 226, and then flows at the third light reflux pressurization pressure 192 by conduit 227 to the first light reflux return manifold 87. Light reflux gas from second light reflux exit manifold 75 flows at the first cocurrent blowdown pressure 171 via conduit 228 and heater 225 to second light reflux pressure letdown means 172, here the second expander stage 230, and then flows at the second light reflux pressurization pressure 191 by conduit 231 to the second light reflux return manifold 85. Light reflux gas from third light reflux exit manifold 77 flows at the second cocurrent blowdown pressure 173 via conduit 232 and heater 225 to third light reflux pressure letdown means 174, here the third expander stage 234, and then flows at the first light reflux pressurization pressure 190 by conduit 235 to the third light reflux return manifold 83. Finally, light reflux gas from fourth light reflux exit manifold 79 flows at the third cocurrent blowdown pressure 175 via conduit 236 and heater 225 to fourth light reflux pressure letdown means 176, here the fourth light reflux expander stage 238, and then flows at substantially the lower pressure 152 by conduit 239 to the fourth light reflux return manifold 81.

Heavy countercurrent blowdown gas from first countercurrent blowdown manifold 57 flows at first countercurrent blowdown intermediate pressure 180 by conduit 240 to heater 241 and thence to first stage 242 of the countercurrent blowdown expander 221 as first exhaust means 181, and is discharged from the expander to exhaust manifold 243 at substantially the lower pressure 152. Countercurrent blowdown gas from second countercurrent blowdown manifold 59 flows at second countercurrent blowdown intermediate pressure 182 by conduit 244 to heater 241 and thence to second stage 245 of the countercurrent blowdown expander 221 as second exhaust means 183, and is discharged from the expander to exhaust manifold 243 at substantially the lower pressure 152. Finally, heavy gas from heavy product exhaust manifold 61 flows by conduit 246 as third exhaust means 184 to exhaust manifold 243 delivering the heavy product gas 185 to be vented at substantially the lower pressure 152.

Heaters 225 and 241 raise the temperatures of gases entering expanders 220 and 221, thus augmenting the recovery of expansion energy and increasing the power transmitted by shaft 222 from expanders 220 and 221 to feed compressor 201, and reducing the power required from prime mover 209. While heaters 225 and 241 are means to provide heat to the expanders, intercoolers 203, 205 and 207 are means to remove heat from the feed compressor and serve to reduce the required power of the higher compressor stages. The heaters and intercoolers are optional features of the invention.

If light reflux heater 249 operates at a sufficiently high temperature so that the exit temperature of the light ref lux expansion stages is higher than the temperature at which feed gas is delivered to the feed manifolds by conduits 212, 214 and 216, the temperature of the second ends 35 of the adsorbers 24 may be higher than the temperature of their first ends 34. Hence, the adsorbers have a thermal gradient along the flow path, with higher temperature at their second end relative to the first end. This is an extension of the principle of "thermally coupled pressure swing adsorption" (TCPSA), introduced by Keefer in U.S. Pat. No. 4,702,903. Adsorber rotor 11 then acts as a thermal rotary regenerator, as in regenerative gas turbine engines having a compressor 201 and an expander 220. Heat provided to the PSA process by heater 225 assists powering the process according to a regenerative thermodynamic power cycle, similar to advanced regenerative gas turbine engines approximately realizing the Ericsson thermodynamic cycle with intercooling on the compression side and interstage heating on the expansion side.

In the instance of PSA applied to oxygen separation from air, the total light reflux flow is much less than the feed flow because of the strong bulk adsorption of nitrogen. Accordingly the power recoverable from the expanders is much less than the power required by the compressor, but will still contribute significantly to enhanced efficiency of oxygen production. By operating the adsorbers at moderately elevated temperature and using strongly nitrogen-selective adsorbents such as Ca-X, Li-X or calcium chabazite zeolites, a PSA oxygen generation system can operate with favourable performance and exceptional efficiency. While higher temperature of the adsorbent will reduce nitrogen uptake and selectivity, the isotherms will be more linear. Effective working capacity in superatmospheric pressure PSA cycles may be enhanced by operation in TCPSA mode with an elevated temperature gradient in the adsorbers. Working with adsorbents such as Ca-X and Li-X, recent conventional practice has been to operate ambient temperature PSA at subatmospheric lower pressures in so-called "vacuum swing adsorption" (VSA), so that the highly selective adsorbents operate well below saturation in nitrogen uptake, and have a large working capacity in a relatively linear isotherm range. At higher temperatures, saturation in nitrogen uptake is shifted to more elevated pressures, so the optimum PSA cycle higher and lower pressures are also shifted upward. For satisfactory operation of the apparatus of FIG. 8, the typical operating temperature of the second ends of the adsorbers may be approximately 50° C. for Ca-X, 80° C. for Li-X and 100° to 150° C. for calcium chabazite.

Figure 10:
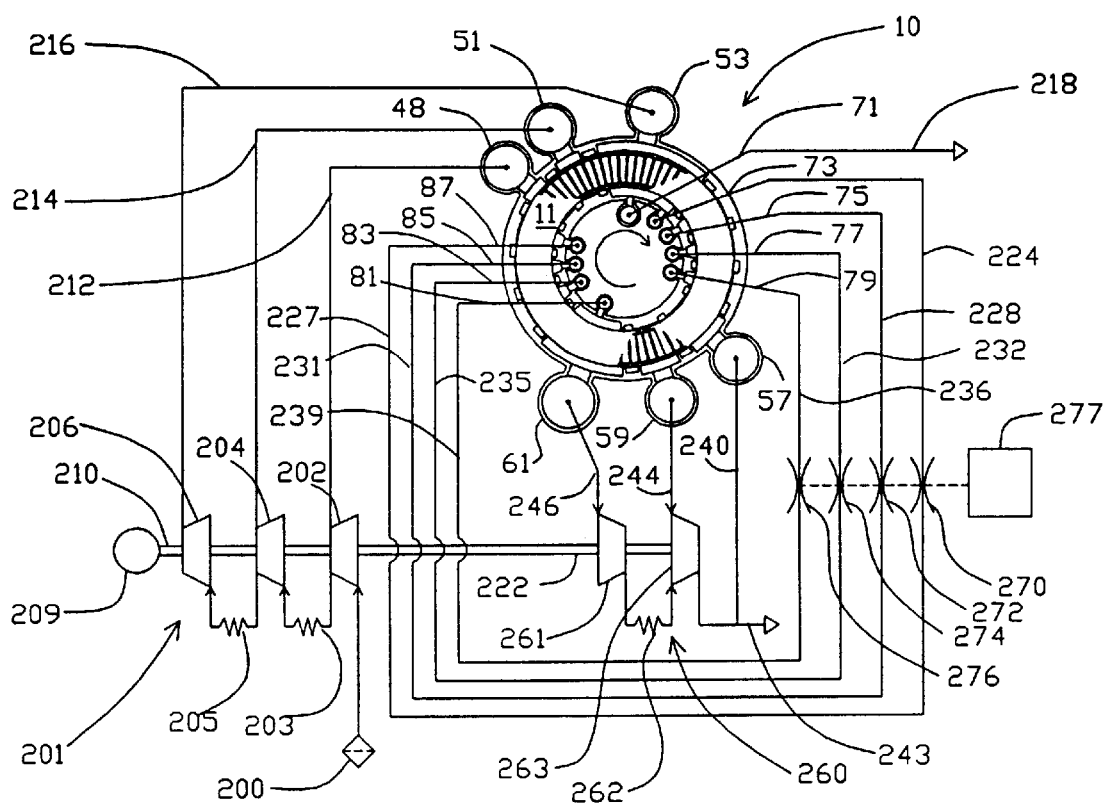
FIG. 10 shows a VPSA apparatus without light reflux energy recovery.

If high energy efficiency were not of highest importance, the light reflux expander stages and the countercurrent blowdown expander stages could be replaced by restrictor orifices or throttle valves for pressure letdown, as illustrated in FIG. 10.

FIG. 9

Figure 9:
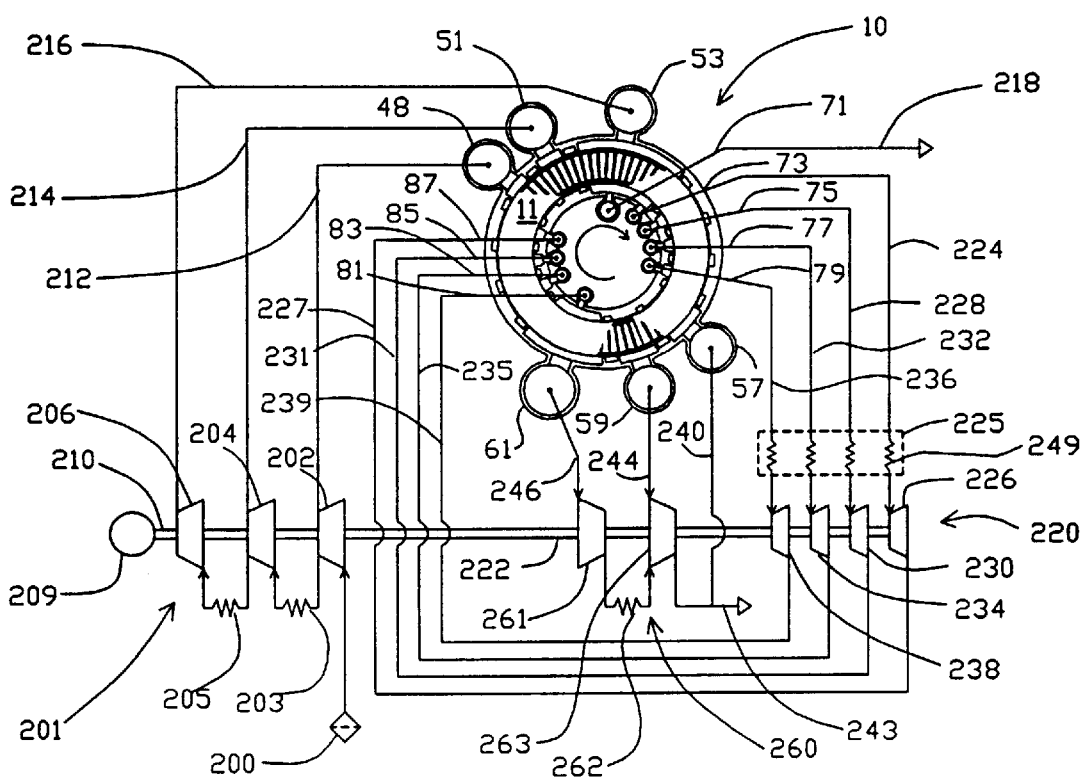
FIG. 9 shows a vacuum PSA (VPSA) for oxygen separation from air.

FIG. 9 shows a vacuum PSA (VPSA) system for oxygen separation from air. Intermediate pressure 158 of FIG. 6 is now nominally atmospheric pressure. Lower pressure 152 and higher pressure 151 may respectively be approximately 0.5 and 1.5 times atmospheric pressure. Feed compressor first stage 202 becomes directly the first feed means feeding manifold 48. Likewise, compressor second stage 204 and third stage 206 operate as the second feed means 162 and third feed means 165 respectively. The condensate separators are omitted for simplicity.

A multistage vacuum pump 260 is driven by shaft 222, and assisted by light reflux expander 220. The vacuum pump may for example be a multistage centrifugal or axial compression machine, or it may be provided by rotary positive displacement machinery adapted to accept inlet gas at multiple suction pressures. First stage vacuum pump 261 (acting as third exhaust means 184) draws nitrogen-enriched air from the heavy product exhaust manifold 61 at substantially the lower pressure, and delivers this gas through intercooler 262 at the second countercurrent blowdown pressure 182 to second stage vacuum pump 263 (acting as second exhaust means 182) which also draws heavy gas from the second countercurrent blowdown manifold 59 at the same pressure. The combined heavy gas discharged from vacuum pump 260 is combined with heavy gas discharged by conduit 240 (acting as first exhaust means 181) to form the heavy product 185 delivered to atmosphere (equal to the first countercurrent blowdown pressure) by conduit 243.

FIG. 10

FIG. 10 shows a VPSA apparatus similar to that of FIG. 9, but with the light reflux pressure letdown means 170, 172, 174 and 176 provided respectively by throttle orifices 270, 272, 274, and 276. The throttle orifices may be fixed orifices, or may be throttle valves with a control actuator 277 for coordinated adjustment of their orifice aperture. Control actuator 277 provides means to adjust the rate of pressure letdown for each light reflux step, so that the process may be adjusted for operation at a different cycle frequency or a different ratio of the higher and lower working pressures. It should be noted that adjustable nozzles (similar to the above adjustable throttles with controller 277) may be alternatively used in conjunction with expansion turbines used for each of the light reflux (or countercurrent blowdown) expander stages.

FIG. 11

Figure 11:
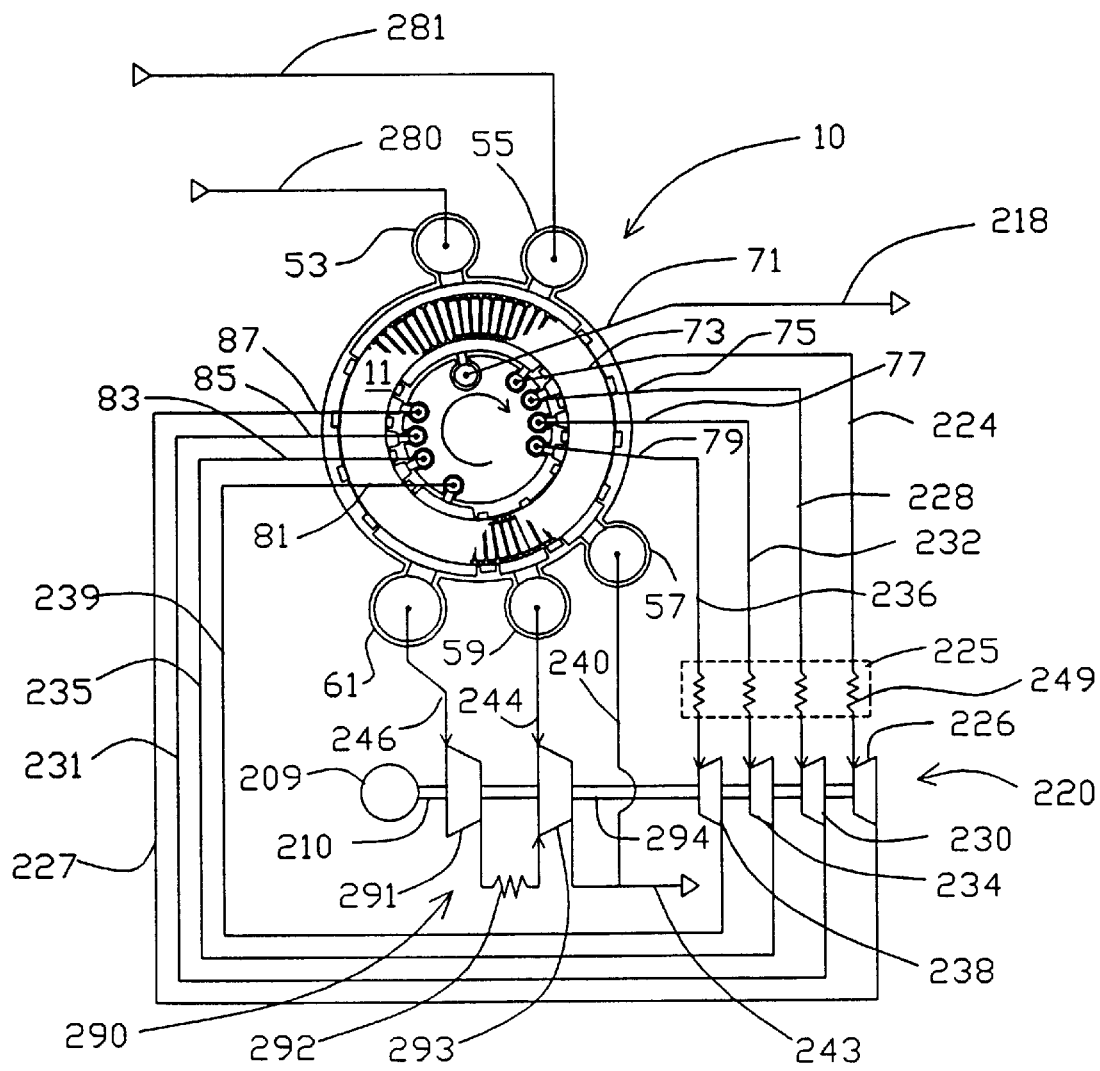
FIG. 11 shows a PSA apparatus adapted to receive two feed gas mixtures, and with recompression of tail gas.

FIG. 11 shows a PSA apparatus adapted to receive two feed gas mixtures, and with recompression of the heavy product gas. A suitable application would be hydrogen recovery from petroleum refinery off gases, e.g. hydrotreater purge gases typically containing light hydrocarbon gases with 30% to 70% hydrogen. Frequently, several off gases of differing hydrogen concentration are available at elevated feed pressures in the range of 10 to 20 atmospheres. Using typical adsorbents, e.g. activated carbon or zeolites, the hydrocarbon impurities will be much more readily adsorbed than hydrogen, so the purified hydrogen will be the light product delivered at the higher working pressure which may be only slightly less than the feed supply pressure, while the impurities will be concentrated as the heavy product and will be exhausted from the PSA process as "PSA tail gas" at the lower working pressure. The tail gas is often either flared or used as fuel gas. For hydrogen duty, positive displacement expansion and compression machinery (e.g. twin screw machines) may be preferred because of the low molecular weight of the gas. Such machines may be adapted in accordance with the invention with extra inlet and/or discharge ports to accept and deliver gas at multiple intermediate pressures. Performance and productivity of PSA hydrogen recovery from refinery off gases (with the adsorbers working at near ambient temperature) will be greatly enhanced by operating with the lower working pressure as low as possible and preferably near atmospheric pressure. However, the tail gas must usually be delivered at a pressure of at least 5 or 6 atmospheres, for disposal to the refinery fuel gas header. Compression costs, particularly for combustible gases under refinery safety constraints, may be prohibitively high.

The apparatus of FIG. 11 is configured to accept first and second feed gas mixtures, the first having a higher concentration of the less readily adsorbed component (e.g. hydrogen) while the second is more concentrated than the first feed gas mixture in the more readily adsorbed fraction. The first feed gas is supplied at substantially the higher working pressure by first infeed conduit 280 to first feed manifold 53, while the second feed gas is supplied at substantially the higher working pressure by second infeed conduit 281 to second feed manifold 55. Each adsorber receives the second feed gas after receiving the first feed gas, so that the concentration profile in the adsorber is monotonically declining in concentration of the more readily adsorbed component along its flow path from first end 34 to second end 35 of the flow path in adsorber element 24. All but the final pressurization steps are here achieved with light reflux gas. The final feed pressurization (from the third light reflux pressurization pressure 192 directly to the higher pressure 151) is achieved as the first end of each adsorber is opened to compartment 52 communicating to manifold 53. Additional feed pressurization steps could readily be incorporated as in the embodiment of FIG. 8.

In this embodiment, the tail gas (heavy product) is discharged from second product delivery conduit at a higher pressure than the lower working pressure, in this example being approximately the first countercurrent blowdown pressure 180 of FIG. 6 with conduit 240 being first exhaust means 181. Tail gas is recompressed by tail gas compressor 290, with compressor first stage 291 being the third exhaust means 184 compressing the first product gas from exhaust manifold 61 via conduit 246, and delivering the first product gas after first stage compression through intercooler 292 to compressor second stage 293 which itself is the second exhaust means compressing second countercurrent blowdown gas from manifold 59 via conduit 244.

FIG. 12

Figure 12:
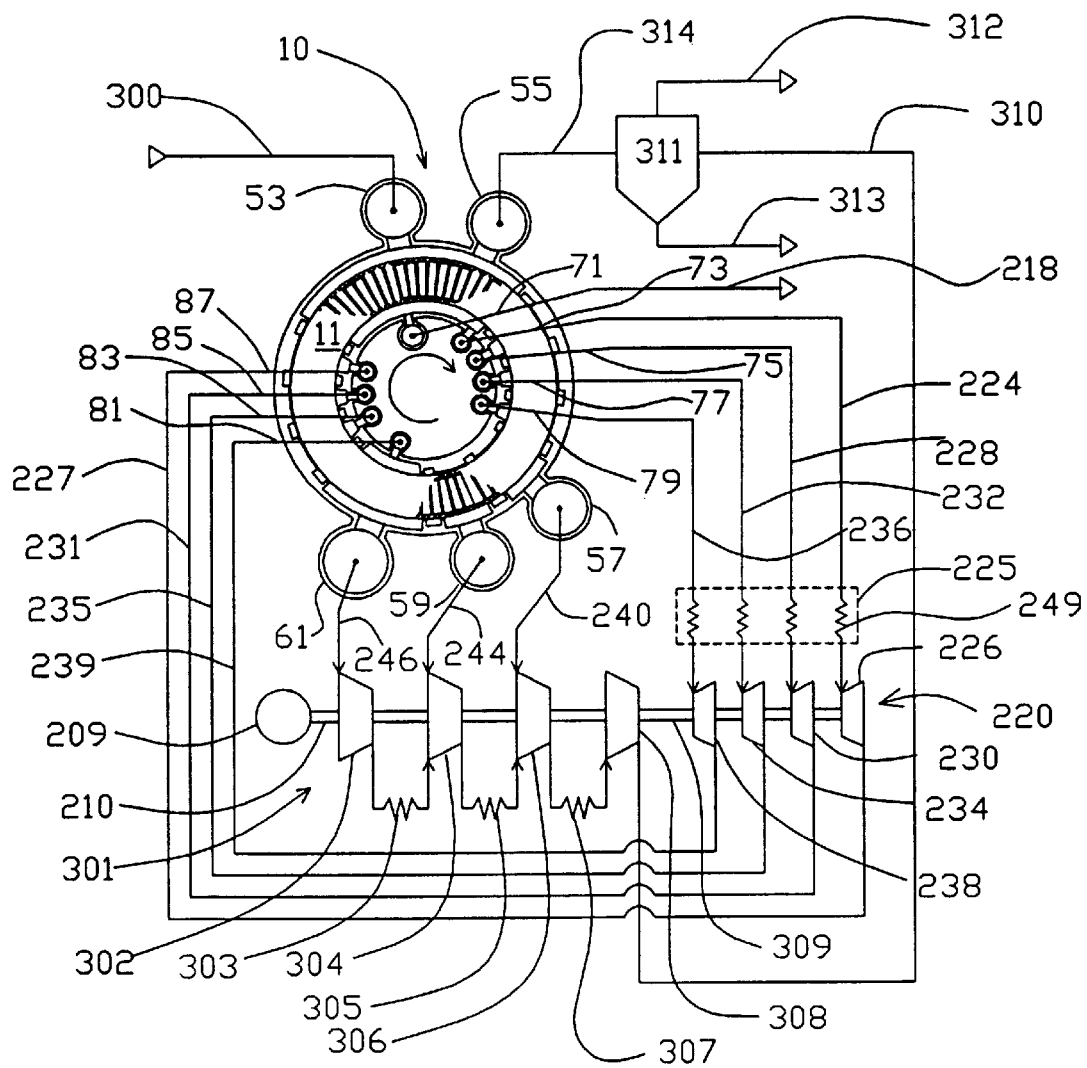
FIG. 12 shows a PSA apparatus with heavy reflux.

FIG. 12 shows a PSA apparatus with heavy ref lux to obtain either higher enrichment and purity of the more readily adsorbed component into the heavy product, or higher yield (recovery) of the less readily adsorbed component into the light product. This apparatus may also be configured to deliver the heavy product at elevated pressure, here approximately the higher working pressure so that both product gases are delivered at about the higher pressure.

The apparatus of FIG. 12 has infeed conduit 300 to introduce the feed gas at substantially the higher pressure to first feed manifold 53. As in the example of FIG. 11, adsorber pressurization is achieved mainly by light reflux, with a final feed pressurization step through manifold 53.

A multistage heavy reflux compressor 301 has a first stage 302 as third exhaust means 184 of FIG. 7, drawing heavy gas by conduit 246 from first product exhaust manifold 61, and compressing this gas through intercooler 303 to second stage 304. Heavy reflux compressor second stage 304 as second exhaust means 183 also draws heavy gas from second countercurrent blowdown manifold 59 through conduit 244, and delivers this gas by intercooler 305 to third stage 306 which as first exhaust means 181 also draws heavy gas from first countercurrent blowdown manifold 57 through conduit 240, and delivers this gas by intercooler 307 to fourth stage 308 which attains substantially the higher working pressure of the PSA cycle. The heavy reflux compressor is driven by prime mover 209 through shaft 210, and by light reflux expander 220 through shaft 309.

The compressed heavy gas is conveyed from compressor fourth stage 308 by conduit 310 to condensate separator 311, from which the heavy product is delivered by conduit 312 which is externally maintained at substantially the higher pressure less frictional pressure drops. Condensed vapours (such as water or liquid hydrocarbons) are removed through conduit 313 at substantially the same pressure as the heavy product in conduit 312. The remaining heavy gas flow, after removal of the first product gas, flows by conduit 314 to the second feed manifold 55 as heavy reflux to the adsorbers following the feed step for each adsorber. The heavy reflux gas is a second feed gas, of higher concentration in the more readily adsorbed component or fraction than the first feed gas.

FIG. 13

Figure 13:
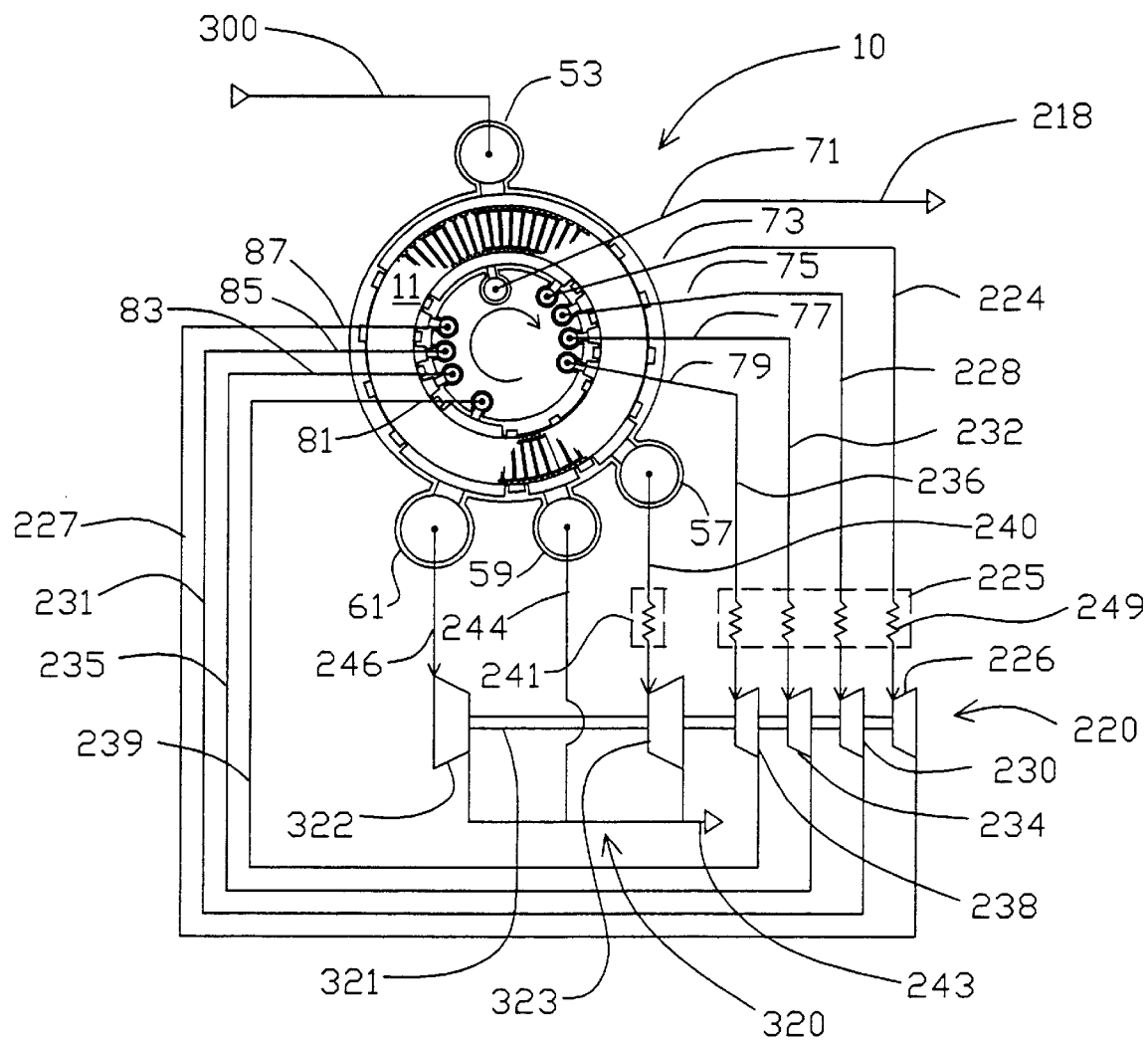
FIG. 13 shows a PSA apparatus with a free rotor tail gas compressor or vacuum pump, powered by energy recovery.

FIG. 13 shows a PSA apparatus with a free rotor tail gas compressor or vacuum pump, powered by energy recovery expanders analogous to a multistage turbocharger. Free rotor compressor 320 includes, on shaft 321, tail gas compressor 322 (or vacuum pump 322, if the lower pressure is subatmospheric) which is the third exhaust means 184 drawing heavy product gas or tail gas from exhaust manifold 61. In this example, the heavy product gas is discharged from conduit 243 at the second countercurrent blowdown pressure 182, which is above the lower pressure. Pressure 182 may here be atmospheric pressure, in which case the third exhaust means is a vacuum pump. Conduit 244 is the second exhaust means 183. The first exhaust means 181 is expander 323 coupled to shaft 321 of free rotor compressor 320. Expander 323 expands heavy gas flowing from manifold 57 through conduit 240 and optional heater 241, and releases that gas to exhaust conduit 243.

The light reflux expander 220 and the countercurrent blowdown expander 323 are both coupled to drive the tail gas compressor 322 by shaft 321, with no other source of mechanical power required. The application of energy recovery (from light reflux and countercurrent blowdown) provides the alternative benefits of reducing the lower pressure so as to improve PSA (or VPSA) cycle performance, or raising the first product delivery pressure as may be required e.g. for tail gas disposal, without the requirement for an electric motor driven compressor. This feature would be particularly useful for hydrogen separation, where reducing the lower pressure greatly improves performance, while elevated tail gas pressures may be desired. Alternatively, a hydrogen PSA system could be operated with a subatmospheric lower pressure, while the tail gas is discharged at sufficiently above atmospheric pressure for combustion in a flare or furnace.

FIG. 14

Figure 14:
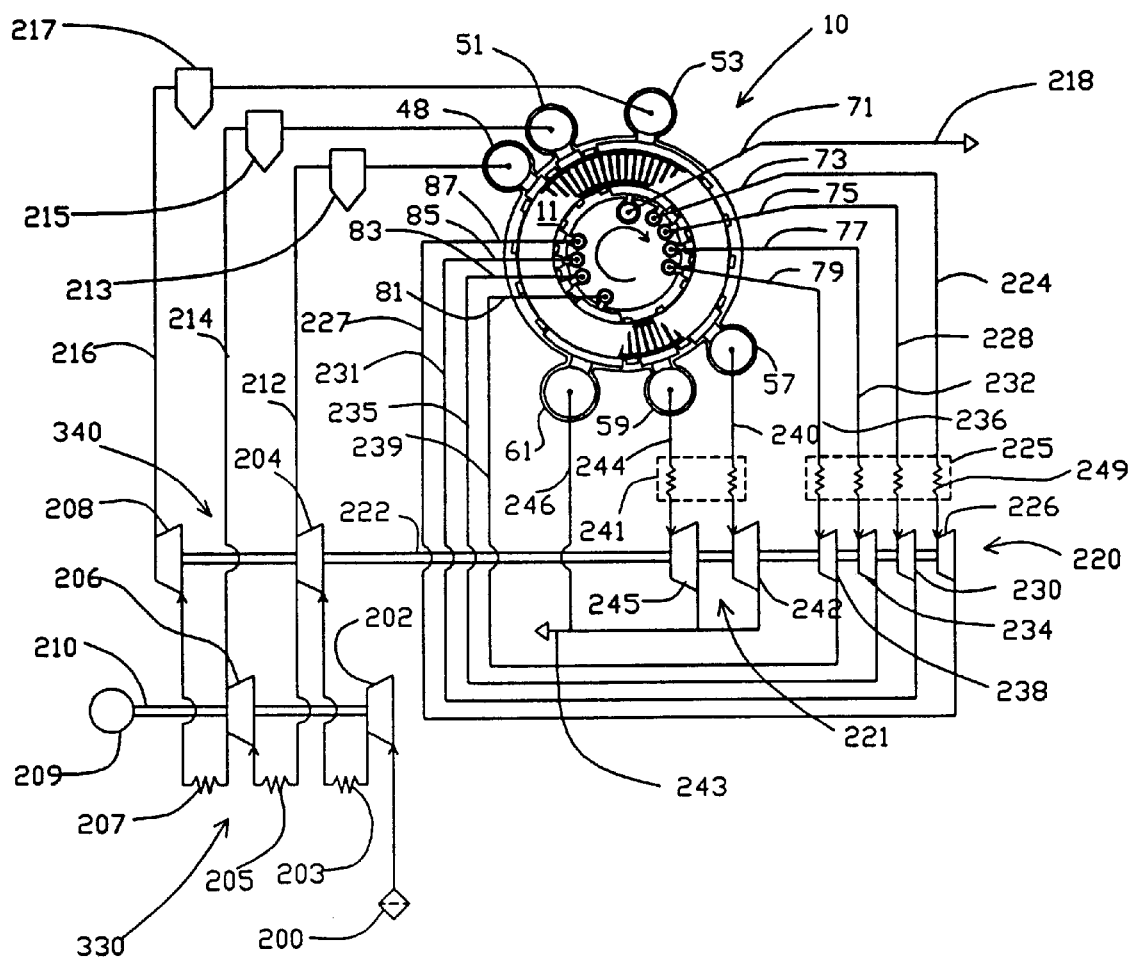
FIG. 14 shows another embodiment of a PSA apparatus with a free rotor compressor.

FIG. 14 shows another embodiment using a free rotor compressor or turbocharger. In this embodiment, applied to oxygen separation from air, a motor driven first feed compressor 330 is driven by prime mover 209 through shaft 210. Using the same nomenclature and reference numerals of feed compression stages as FIG. 8, feed compressor 330 includes feed compression first stage 202 and third stage 206 on shaft 210 driven by motor 209. Free rotor second compressor 340 includes feed compression second stage 204 and fourth stage 208 on shaft 222, driven by countercurrent blowdown expander 221 and light reflux expander 220 through shaft 222. This configuration enables operation of a motor driven feed compressor with a limited number of stages (here 2 stages) to operate a PSA cycle with a larger number of feed supply pressures (here the three pressures 161, 163 and 151 of FIG. 6), since the free rotor compressor has dual functions as means to boost feed pressure by application of thermally boosted expansion energy recovery, and means to split the stage intermediate pressures for supply to the PSA module.

FIG. 15

Figure 15:
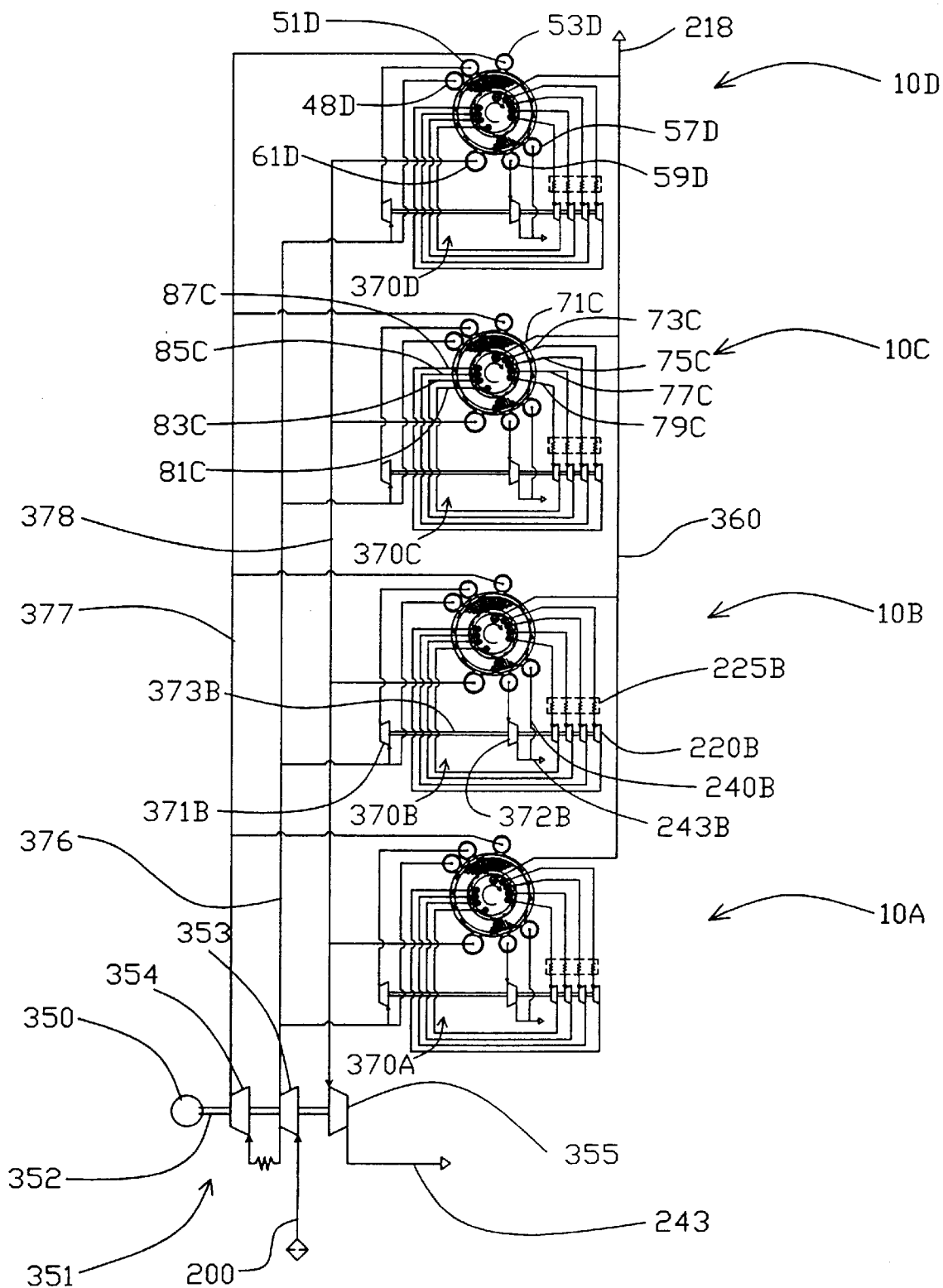
FIG. 15 shows a VPSA apparatus with 4 modules.

FIG. 15 shows a VPSA oxygen generation plant with 4 modules in parallel, each having a free rotor booster compressor powered by energy recovery expanders, and the entire apparatus having a single prime mover 350 which may for example be an electric motor or a gas turbine. Prime mover 350 drives first feed compressor 351 on shaft 352. Feed compressor 351 has a first stage 353 drawing feed gas from infeed conduit 200, and a third stage 354. The second stage of feed compression is provided by the free rotor compressors of each module. The first feed compressor 351 in this embodiment also includes an exhaust vacuum pump 355 likewise coupled to shaft 352.

Figure 16:
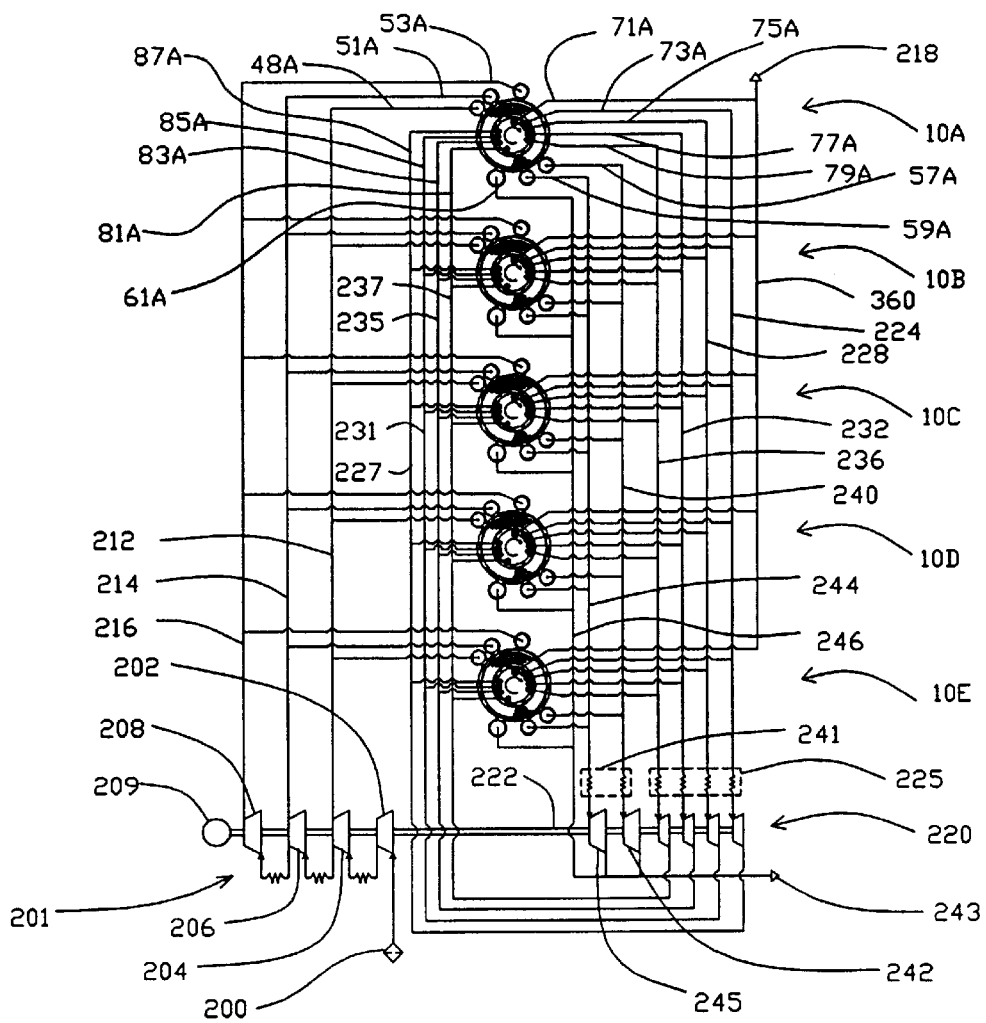
FIG. 16 shows a PSA apparatus with 5 modules.

The plant includes four identical modules 10A, 10B, 10C and 10D. In FIGS. 15 and 16, component nomenclature and reference numerals follow that established for FIGS. 1–14, with a suffix A to D appended to the reference numerals for module components, and each component so identified with reference to any one module will be identically found in each of the other modules. The first manifolds are identified with reference to module 10D as 48D and 51D for feed pressurization, 53D for feed supply at the higher pressure, 57D and 59D for countercurrent blowdown, and 61D for exhaust at the lower pressure. The second manifolds are identified with reference to module 10C as 71C communicating to light product delivery manifold 360 and delivery conduit 218, light reflux exit manifolds 73C, 75C, 77C and 79C, and light reflux return manifolds 81C, 83C, 85C and 87C.

The identical free rotor compressor for each module will be described with reference to module 10B. Free rotor compressor assembly 370B includes feed compression second stage 371B and vacuum pump 372B, both coupled by shaft 373B to light reflux expander 220B. Feed gas compressed by feed compressor first stage 353 is conveyed by feed manifold 376 in parallel to the first feed pressurization manifold (e.g. 48D) of each module, and to the inlet of feed compression second stage (e.g. 371B) of the free rotor compressor assembly (e.g. 370B) of each module which delivers further compressed feed pressurization gas to the second feed pressurization manifold (e.g. 51D) of each module. Feed gas compressed to the higher pressure by third feed compressor stage 354 is conveyed by feed manifold 377 in parallel to the first feed supply manifold (e.g. 53D) of each of the modules. Heavy gas at the lower pressure is drawn from the heavy compartment (e.g. 61D) of each module through vacuum exhaust manifold 378 to exhaust vacuum pump 355 as the third exhaust means. Countercurrent blowdown gas from the first countercurrent blowdown manifold (e.g. 57D) of each module is discharged by e.g. conduit 240B as first exhaust means, while countercurrent blowdown gas from the second countercurrent blowdown manifold (e.g. 59D) of each module is exhausted by vacuum pump (e.g. 372B) of the free rotor compressor assembly as second exhaust means, delivering the heavy tail gas to the module heavy product or waste gas exhaust, e.g. 243B.

FIG. 16

FIG. 16 shows a PSA apparatus with 5 modules 10A–10E. In this embodiment, the prime mover, all compressor stages and all expander stages are directly mechanically coupled (e.g. on a single shaft) exactly following the embodiment and component descriptions of FIG. 8, with the only difference being the connection in parallel of multiple modules.

FIGS. 17, 18, 19 and 20

Figure 17:
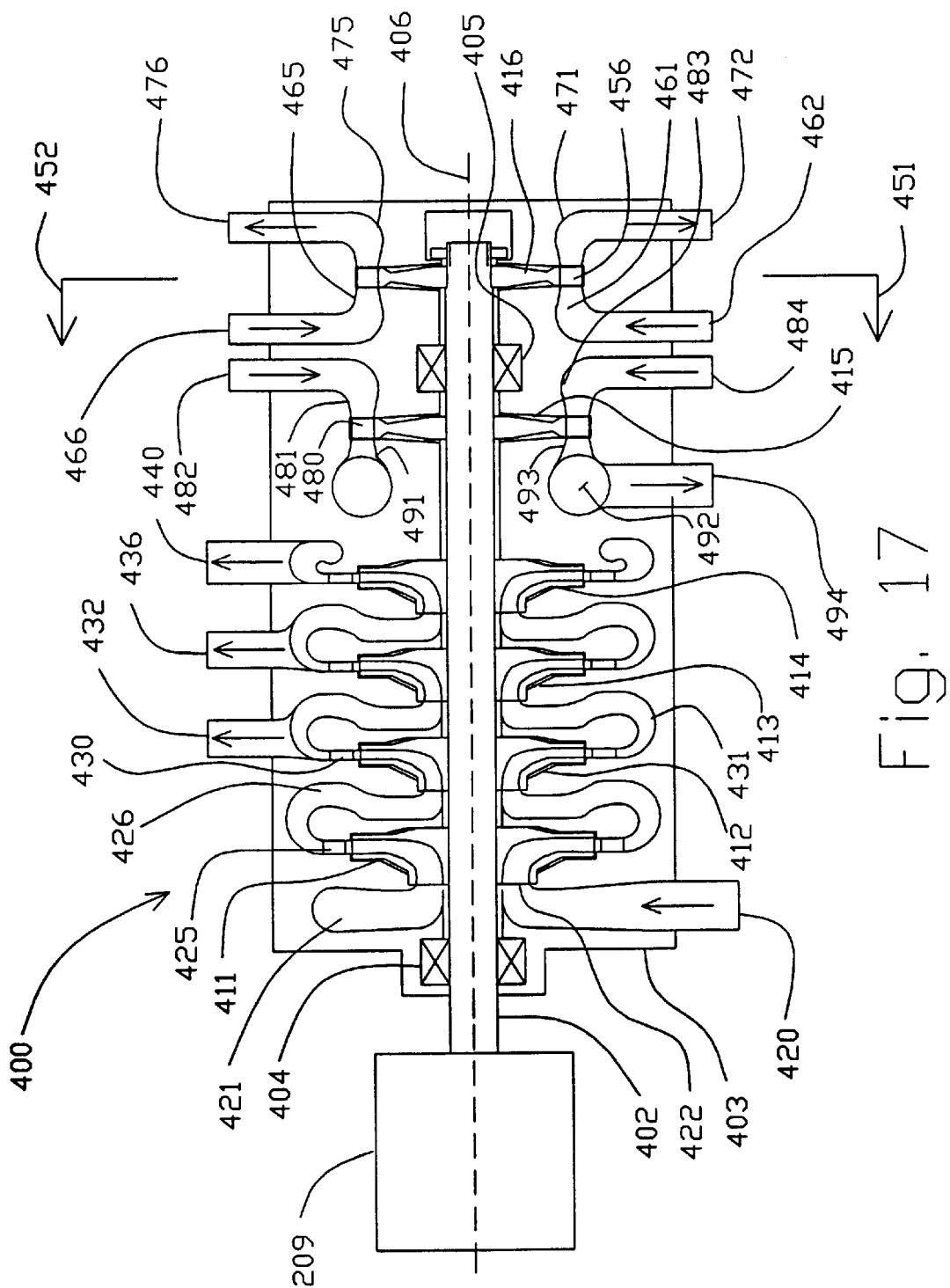
FIG. 17 shows a multistage centrifugal compressor with impulse turbine expanders for the light reflux and countercurrent blowdown.

FIG. 17 shows a multistage centrifugal compressor 400 with impulse turbine expanders for the light reflux and countercurrent blowdown, configured to provide the feed compressor stages 202, 204, 206 and 208, the countercurrent blowdown expander stages 242 and 245, and the light reflux expander stages 226, 230, 234, and 238 of FIG. 8. Prime mover 209 drives shaft 402, supported in compressor casing 403 by bearings 404 and 405 on axis 406. Shaft 402 carries compressor first stage impeller 411, second stage impeller 412, third stage impeller 413 and fourth stage impeller 414, exhaust impulse turbine runner 415 and light reflux impulse turbine runner 416.

Feed air from PSA plant inlet 200 enters suction port 420 to suction scroll 421 to the inlet 422 of impeller 411. Impeller 411 discharges the air to first stage diffuser 425 and first stage collector scroll 426, which directs the first stage compressed air to the inlet of the second stage impeller 412. Impeller 412 discharges the air to second stage diffuser 430 and second stage collector scroll 431, from which second stage delivery port 432 discharges a portion of the feed air as pressurization gas at the second stage pressure to conduit 212. Similarly, the feed air is compressed by the third and fourth stage impellers 413 and 414, discharging air at the third stage pressure from third stage delivery port 436 communicating to conduit 214, and at the fourth stage pressure from fourth stage delivery port 440.

The multistage centrifugal compressor 400 provides the stages of feed compressor 201 in FIG. 8. Multistage vacuum pumps, as required in the embodiment of FIG. 9, may similarly be provided as conventional centrifugal stages. For a large multiple module plant, for example as described in FIG. 16, the exhaust and light reflux expander turbines may be provided as multistage radial inflow turbines whose stages would be mechanically similar to the centrifugal stages of FIG. 17. In larger plants, expander stages may also be provided as full admission axial turbine stages, similar to gas turbine stages.

For particular advantage in smaller plant capacities, considerable simplification is obtained in the embodiment of FIGS. 17–20 by using partial admission impulse turbines for countercurrent blowdown and light reflux expansion, with each expander stage occupying a sectoral arc of the corresponding turbine on a single runner wheel. This approach is practicable because the stages for each turbine expand gases of approximately similar composition across adjacent pressure intervals.

Figure 18:
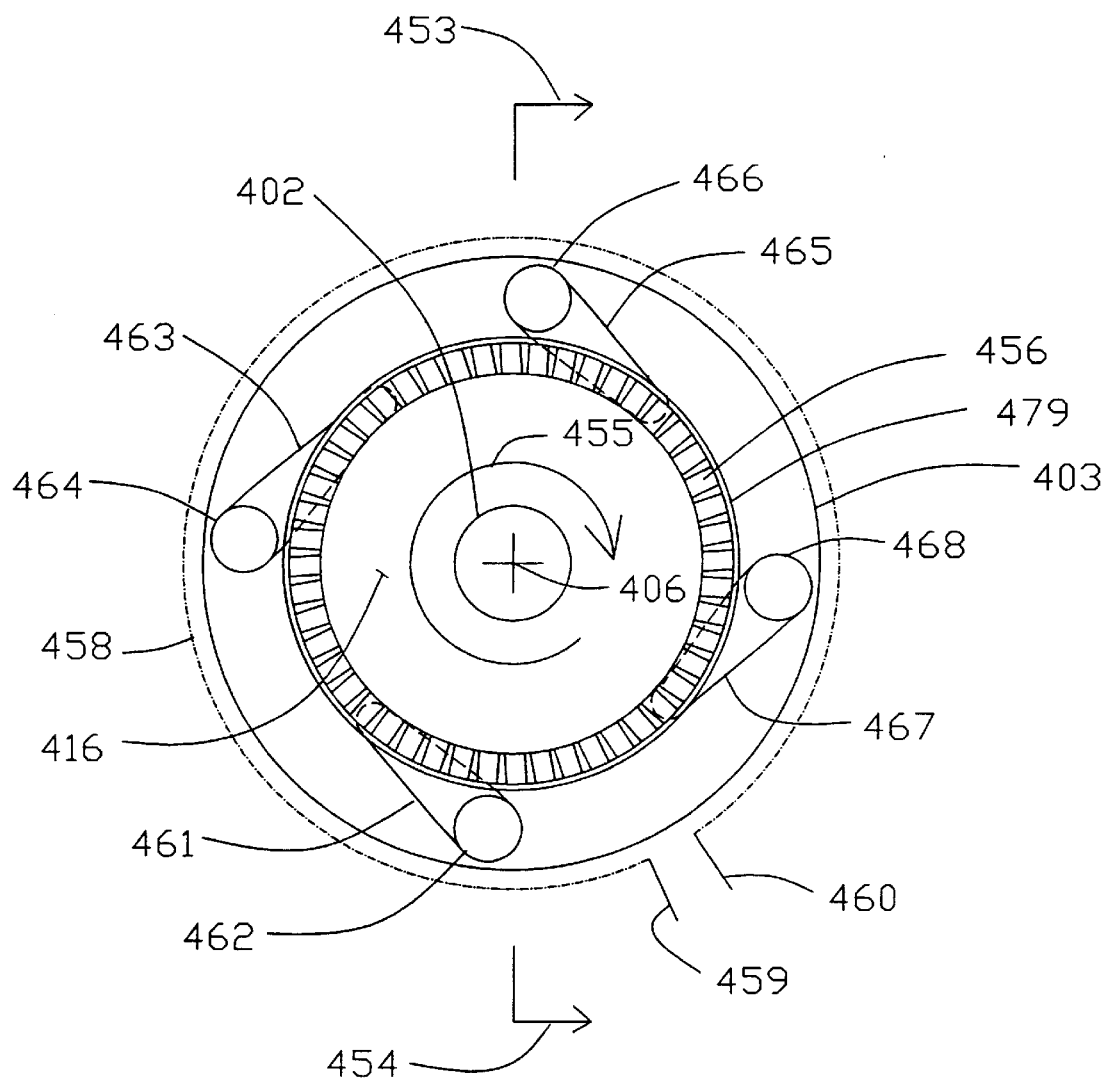
FIG. 18 shows the light reflux impulse turbine runner with four nozzles.
Figure 19:
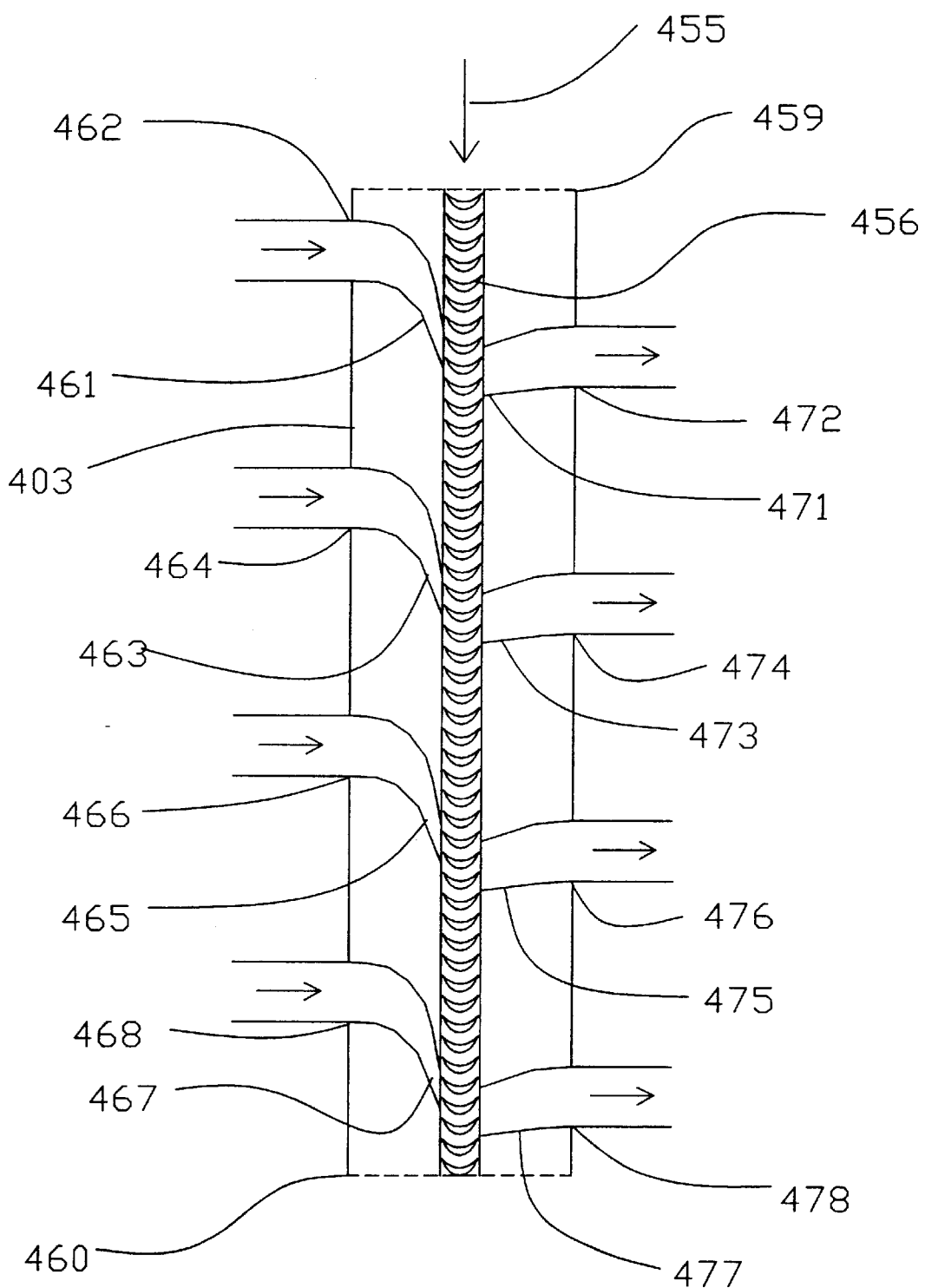
FIG. 19 is an unrolled view of the light reflux expander impulse turbine.

FIG. 18 is a section of FIG. 17, defined by arrows 451 and 452, across the plane of light reflux impulse turbine runner 416. FIG. 17 is a section of FIG. 18, in the plane indicated by arrows 453 and 454. Runner 416 rotates about axis 406 in the direction indicated by arrow 455. Runner 416 has blades 456 mounted on its rim. FIG. 19 is a projected view of the light reflux expander impulse turbine, unrolled around 3600 of the perimeter of the impulse turbine as indicated by the broken circle 458 with ends 459 and 460 in FIG. 18.

The light reflux turbine has four nozzles serving the four 900 quadrants of the runner to provide the four expansion stages, including first nozzle 461 receiving flow from port 462 communicating to conduit 224, second nozzle 463 receiving flow from port 464 communicating to conduit 228, third nozzle 465 receiving flow from port 466 communicating to conduit 232, and fourth nozzle 467 receiving flow from port 468 communicating to conduit 236.

The first stage light reflux flow from nozzle 461 impinges blades 456, and is collected in diffuser 471 and discharged at the reduced pressure by port 472 communicating to conduit 227. Similarly the light reflux flow from nozzle 463 is collected in diffuser 473 and flows by port 474 to conduit 231, the light reflux flow from nozzle 465 is collected in diffuser 475 and flows by port 476 to conduit 235, and the light reflux flow from nozzle 467 is collected in diffuser 477 and flows by port 478 to conduit 239. To minimize interstage leakage losses, the channel gap 479 between the casing 403 and blades 456 of runner 416 is appropriately narrow between quadrants.

Figure 20:
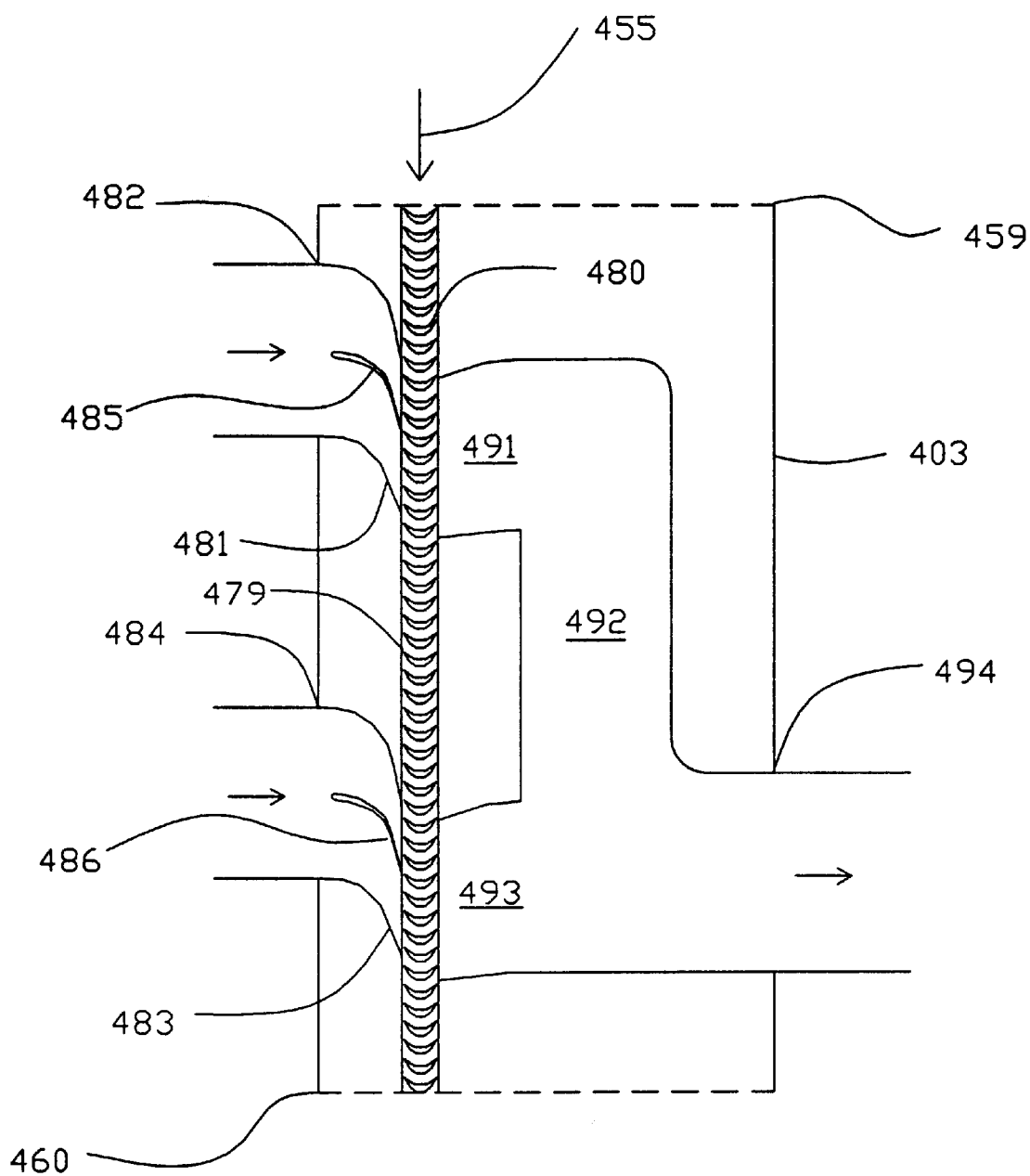
FIG. 20 is an unrolled view of the countercurrent blowdown expander impulse turbine.

The exhaust expander turbine, or countercurrent blowdown expander turbine, has two stages. Its sectional arrangement is similar to that depicted in FIG. 18, except that two rather than four nozzles and diffusers are required for the two exhaust stages. FIG. 20 is an unrolled projection around exhaust turbine runner 415 as indicated by broken circle 458 for the light reflux turbine. The exhaust turbine has impulse blades 480 on runner 415. Nozzle 481 receives the first countercurrent blowdown stream by port 482 communicating to conduit 240, while nozzle 483 receives the second countercurrent blowdown stream by port 484 communicating to conduit 244. Nozzles 481 and 483 have guide vanes 485 and 486, and direct the countercurrent blowdown flows to impinge on blades 480 in opposite half sectors of the turbine 415. After deflection by blades 480, the expanded flow from nozzle 481 is collected in diffuser 491, and is passed to collector ring manifold 492. The flow from nozzle 483 likewise passes the blades 480 and is collected in diffuser 493 joining manifold 492 to deliver the combined low pressure exhaust flow by exhaust port 494 which is connected to the discharge 243.

INDUSTRIAL APPLICABILITY

The above examples have illustrated the range of industrial applicability, considering both air separation and hydrogen purification examples.

The embodiments of FIGS. 8, 9, 13 and 14 particularly illustrate configurations with high energy efficiency for oxygen generation. The embodiments of FIGS. 15 and 16 show the potential for scale up to large oxygen plants, with strong economies of scale because a single prime mover can be coupled to multiple PSA modules without compromise of efficiency. Operation of the compression and expansion machinery under steady state conditions is advantageous for equipment reliability and efficiency.

The embodiments of FIGS. 11, 12 and 13 are attractively applicable to hydrogen purification applications, with advantages of (1) the ability to accept multiple feed gases of varying concentration, (2) the attainment of high hydrogen yield (fractional recovery from feed) using heavy reflux, (3) the ability using energy recovery to boost tail gas pressure for disposal in a fuel gas header or combustion furnace without external mechanical compression power, and (4) the ability to operate at a very low and even subatmospheric lower cycle pressure, again using energy recovery as the sole power source to pump down the lower pressure.

The heavy reflux embodiment of FIG. 12 may also be advantageously applied in separation to generate purified nitrogen as the heavy product separated using nitrogen selective zeolite adsorbents.

The invention enables a major advance in energy efficiency of gas separation by PSA, owing to its highly efficient recovery of expansion energy waste in prior art PSA processes. The invention also provides for thermal boosting of the expansion energy recovery, by applying a heat source through a regenerative thermodynamic cycle.

The invention also enables a major reduction in plant capital costs, by (1) radical simplification of valves and controls since the PSA cycle is established simply by rotating the rotary modules, (2) reduction of adsorbent inventory by moving to high cycle frequencies, and (3) reduced pressure vessel costs through the size reduction of high cycle frequency and the substantial elimination of structural fatigue by large amplitude pressure cycling because the working pressure in each compartment of the module pressure housing is substantially static. For the largest industrial gas separation plants, large economies of both capital cost and energy efficiency are realized by the use of large single shaft prime movers to perform gas compression and blowdown energy recovery for any number of identical modules connected in parallel.

We claim:

1. Process for pressure swing adsorption separation of a feed gas mixture containing a more readily adsorbed component and a less readily adsorbed component, with the more readily adsorbed component being preferentially adsorbed from the feed gas mixture by an adsorbent material under increase of pressure, so as to separate from the feed gas mixture a heavy product gas enriched in the more readily adsorbed component and a light product gas depleted in the more readily adsorbed component; providing for the process a cooperating set of adsorber elements within a rotor and angularly spaced about the axis defined by rotation of the rotor relative to a stator, and rotating the rotor at a rotational frequency so as to generate within each adsorber element cyclic variations of pressure and flow at a cyclic frequency along a flow path contacting the adsorbent material between first and second ends of the adsorber element, the cyclic variations of pressure extending between a higher pressure and a lower pressure of the process, and the ratio of the cycle frequency to the rotational frequency is an integer number; rotating the rotor so that the first ends of the adsorber elements successively communicate by first apertures to compartments of the stator and in a first valve surface between the rotor and the stator, and the second ends of the adsorber elements successively communicate by second apertures to compartments of the stator and in a second valve surface between the rotor and the stator; with the compartments including a feed compartment and a heavy product compartment in the first valve surface, a light product compartment in the second valve surface, blowdown compartments in the first and/or second valve surface, and pressurization compartments in the first and/or second valve surface; the process including:

(a) continuously supplying the feed gas mixture to the feed compartment at substantially the higher pressure, and continuously withdrawing the light product gas from the light product compartment at substantially the higher pressure less flow frictional pressure drops, (b) continuously withdrawing gas from the blowdown compartments at an intermediate blowdown pressure between the higher and lower pressures for each blowdown compartment, (c) continuously withdrawing the heavy product gas from the heavy product compartment at substantially the lower pressure, and (d) continuously supplying gas to the pressurization compartments at an intermediate pressurization pressure between the higher and lower pressures for each pressurization compartment;

so that each adsorber element undergoes the steps in sequence at the cyclic frequency of:

(i) admission of the feed gas mixture and withdrawal of the light product gas at substantially the higher pressure, (ii) a plurality of blowdown steps, in which the adsorber element releases gas successively to the blowdown compartments in the first and/or second valve surface so as to reduce the pressure in the adsorber element to descending ones of the intermediate blowdown pressures for each blowdown step between the higher and lower pressures, (iii) withdrawal of the heavy product gas at substantially the lower pressure, and (iv) a plurality of pressurization steps, in which the adsorber element accepts gas successively from the pressurization compartments in the first and/or second valve surface so as to increase the pressure in the adsorber element to ascending ones of the intermediate pressurization pressures for each pressurization step between the lower and the higher pressures;

with the rate of pressure change in the adsorber element during steps (ii) and (iv) limited by flow restriction across the first and second apertures, so that the maximum rate of pressure change during those steps is less than approximately five times the average rate of pressure change during those steps.

2. The process of claim 1, in which the maximum rate of pressure change during steps (ii) and (iv) is less than approximately two times the average rate of pressure change during those steps.

3. The process of claim 1, further rotating the rotor at a rotational frequency equal to the cycle frequency.

4. The process of claim 3, in which the ratio of the cycle frequency to the rotational frequency is an integer number greater than one.

5. The process of claim 1, further characterized as continuously withdrawing gas from the blowdown compartments in the first valve surface at countercurrent blowdown intermediate pressures above the lower pressure, and continuously withdrawing gas from the blowdown compartments in the second valve surface at the cocurrent blowdown intermediate pressures below the higher pressure, with the cocurrent blowdown intermediate pressures being above the countercurrent blowdown intermediate pressures; while in step (ii) for each adsorber initially releasing gas to the blowdown compartments in the second valve surface at the cocurrent blowdown intermediate pressures, and subsequently releasing gas to the blowdown compartments in the first valve surface at the countercurrent blowdown intermediate pressures.

6. The process of claim 5, further performing a stage of light reflux, characterized as continuously withdrawing gas depleted in the more readily adsorbed component as light reflux gas from a light reflux exit compartment in the second valve surface at a light reflux exit pressure which is the higher pressure or a pressure less than the higher pressure, performing pressure let-down of the light reflux gas, and continuously returning the light reflux gas to a light reflux return compartment in the second valve surface at the lower pressure or a pressure less than the light reflux exit pressure.

7. The process of claim 6 in which the light reflux exit compartment is a blowdown compartment at one of the blowdown pressures less than the higher pressure.

8. The process of claim 6 in which the light reflux return compartment is a pressurization compartment at one of the pressurization pressures less than the light reflux exit pressure.

9. The process of claim 6, further performing a plurality of the stages of light reflux at successively descending ones of the light reflux exit pressures, so as to reduce the pressure interval between successive ones of the light reflux exit pressures as a fraction of the pressure interval between the higher and lower pressures.

10. The process of claim 6, further performing pressure let-down of the light reflux gas by mechanically expanding the light reflux gas to recover energy.

11. The process of claim 10, further heating the light reflux gas before performing pressure let-down, so as to enhance the recovery of energy.

12. The process of claim 6, alternatively performing pressure let-down of the light ref lux gas by throttling over an orifice.

13. The process of claim 5, further characterized as continuously withdrawing gas from a plurality of the blowdown compartments in the first valve surface at successively descending ones of the countercurrent blowdown intermediate pressures, so as to reduce the pressure interval between successive ones of the countercurrent blowdown intermediate pressures as a fraction of the pressure interval between the higher and lower pressures.

14. The process of claim 5, further continuously withdrawing the heavy product gas from one of the blowdown compartments in the first valve surface at one of the countercurrent blowdown intermediate pressures, continuously performing pressure let-down of the withdrawn heavy product gas to an exhaust pressure substantially equal to or greater than the lower pressure, and delivering the exhausted heavy product gas at the exhaust pressure.

15. The process of claim 14, further performing pressure let-down of the withdrawn heavy product gas by mechanically expanding the withdrawn heavy product gas to recover energy.

16. The process of claim 15, further heating the withdrawn heavy product gas before performing pressure let-down, so as to enhance the recovery of energy.

17. The process of claim 14, alternatively performing pressure let-down of the withdrawn heavy product gas by throttling over an orifice.

18. The process of claim 5, further continuously withdrawing the heavy product gas from one of the blowdown compartments in the first valve surface at one of the countercurrent blowdown intermediate pressures, continuously compressing the withdrawn heavy product gas to an exhaust pressure greater than the one countercurrent blowdown intermediate pressure, and delivering the compressed heavy product gas at the exhaust pressure.

19. The process of claim 18, also continuously withdrawing the heavy product gas from the heavy product compartment in the first valve surface at substantially the lower pressure, continuously compressing the heavy product compartment heavy product gas to an exhaust pressure greater than the lower pressure, and delivering the compressed heavy product compartment heavy product gas at the exhaust pressure.

20. The process of claim 5, further continuously withdrawing gas enriched in the more readily adsorbed component from one of the blowdown compartment in the first valve surface at one of the countercurrent blowdown intermediate pressures, continuously compressing the withdrawn heavy product gas to substantially the higher pressure, and continuously returning the compressed heavy product gas as heavy reflux gas to the feed compartment in the first valve surface so as to further increase the concentration of the more readily adsorbed component in the heavy product.

21. The process of claim 5, further continuously withdrawing gas enriched in the more readily adsorbed component from the heavy product compartment in the first valve surface at substantially the lower pressure, continuously compressing the withdrawn heavy product gas to substantially the higher pressure, and continuously returning the compressed heavy product gas as heavy reflux gas to the feed compartment in the first valve surface so as to further increase the concentration of the more readily adsorbed component in the heavy product.

22. The process of claim 1, further continuously supplying the feed gas mixture to one of the pressurization compartments in the first valve surface at a pressure less than the higher pressure.

23. The process of claim 1, further continuously supplying the feed gas mixture to a plurality of the pressurization compartments in the first valve surface at successively increasing intermediate pressures less than the higher pressure, so as to reduce the pressure interval between successive ones of the intermediate pressures as a fraction of the pressure interval between the higher and lower pressures.

24. The process of claim 1, further rotating the rotor at a high rotational frequency so as to subject the adsorber element to a centripetal acceleration of at least 5 times the acceleration of gravity.

25. Process for pressure swing adsorption separation of a feed gas mixture containing a more readily adsorbed component and a less readily adsorbed component, with the more readily adsorbed component being preferentially adsorbed from the feed gas mixture by an adsorbent material under increase of pressure, so as to separate from the feed gas mixture a heavy product gas enriched in the more readily adsorbed component and a light product gas depleted in the more readily adsorbed component; providing for the process a cooperating set of adsorber elements within a rotor and angularly spaced about the axis defined by rotation of the rotor relative to a stator, and rotating the rotor at a rotational frequency so as to generate within each adsorber element cyclic variations of pressure and flow at a cyclic frequency along a flow path contacting the adsorbent material between first and second ends of the adsorber element, the cyclic variations of pressure extending between a higher pressure and a lower pressure of the process, and the ratio of the cyclic frequency to the rotational frequency is an integer number; rotating the rotor so that the first ends of the adsorber elements successively communicate by first apertures to compartments of the stator and in a first valve surface between the rotor and the stator, and the second ends of the adsorber elements successively communicate by second apertures to compartments of the stator and in a second valve surface between the rotor and the stator; with the compartments including a feed compartment and a heavy product compartment in the first valve surface, a light product compartment in the second valve surface, blowdown compartments in the first and/or second valve surface, and pressurization compartments in the first and/or second valve surface; the process including:

(a) continuously supplying the feed gas mixture to the feed compartment at substantially the higher pressure, and continuously withdrawing the light product gas from the light product compartment at substantially the higher pressure less flow frictional pressure drops, (b) continuously withdrawing gas from the blowdown compartments at an intermediate blowdown pressure between the higher and lower pressures for each blowdown compartment, (c) continuously withdrawing the heavy product gas from the heavy product compartment at substantially the lower pressure, and (d) continuously supplying gas to the pressurization compartments at an intermediate pressurization pressure between the higher and lower pressures for each pressurization compartment;

so that each adsorber element undergoes the steps in sequence at the cyclic frequency of:

(i) admission of the feed gas mixture and withdrawal of the light product gas at substantially the higher pressure, (ii) a plurality of light reflux steps, in each of which the adsorber element releases light reflux gas which is gas depleted in the more readily adsorbed component from a light reflux exit compartment in the second valve surface at a light reflux exit pressure which is the higher pressure or a pressure less than the higher pressure, and a stage of pressure let-down is performed on the light reflux gas to reduce its pressure, (iii) at least one countercurrent blowdown step, in which the adsorber element releases gas successively to the blowdown compartments in the first and/or second valve surface so as to reduce the pressure in the adsorber element to descending ones of the intermediate blowdown pressures for each countercurrent blowdown step toward the lower pressure, (iv) withdrawal of the heavy product gas from the first end of the adsorber element at substantially the lower pressure, while the light reflux gas is simultaneously admitted as purge gas to the second end of the adsorber element, and (v) a plurality of pressurization steps, in which the adsorber element accepts gas successively from the pressurization compartments in the first and/or second valve surface so as to increase the pressure in the adsorber element to ascending ones of the intermediate pressurization pressures for each pressurization step between the lower and the higher pressures, with the pressurization compartments in the second valve surface being light reflux return compartments receiving the light reflux gas following the pressure let-down of step (ii).

26. The process of claim 25, further continuously supplying the feed gas mixture to a plurality of the pressurization compartments in the first valve surface at successively increasing ones of the intermediate pressurization pressures, so as to reduce the pressure interval between successive ones of the intermediate pressurization pressures as a fraction of the pressure interval between the higher and lower pressures.

27. Apparatus for pressure swing adsorption separation of a gas mixture containing a more readily adsorbed component and a less readily adsorbed component, with the more readily adsorbed component being preferentially adsorbed from the gas mixture by an adsorbent material under increase of pressure between a lower pressure and a higher pressure, so as to separate from the gas mixture a heavy product gas enriched in the more readily adsorbed component and a light product gas depleted in the more readily adsorbed component; the apparatus having one module or a plurality of modules in parallel, each module of the apparatus including a rotor cooperating with a stator mutually defining the rotational axis of the rotor, the rotor containing a cooperating set of adsorber elements angularly spaced about the rotational axis, each adsorber element having a flow path contacting the adsorbent material between first and second ends of the adsorber element, the first ends of the adsorber elements communicating by first apertures to a first valve surface between the rotor and the stator, and the second ends of the adsorber elements communicating by second apertures to a second valve surface between the rotor and the stator; the apparatus further including:

(a) a feed compartment in the stator and open to the first valve surface in a feed angular sector thereof, and means to supply feed gas continuously to the feed compartment at substantially the higher pressure, (b) a heavy product compartment in the stator and open to the first valve surface, and means to withdraw heavy product gas continuously from the heavy product compartment at substantially the lower pressure, (c) a light product compartment in the stator and open to the first valve surface, and means to withdraw light product gas continuously from the light product compartment at substantially the higher pressure less flow frictional pressure drops, (d) a plurality of pressurization compartments in the stator and open to the first and/or second valve surfaces, and means to supply pressurization gas to the pressurization compartments at an intermediate pressurization pressure for each pressurization compartment, and (e) a plurality of blowdown compartments in the stator and open to the first and/or second valve surfaces, and means to withdraw blowdown gas from the blowdown compartments at an intermediate blowdown pressure for each blowdown compartment.

28. The apparatus of claim 27, with the first ends of the adsorber elements communicating directly and with minimal dead volume by first apertures to the first valve surface, and the second ends of the adsorber elements communicating directly and with minimal dead volume by second apertures to the second valve surface.

29. The apparatus of claim 27, further including sealing means in the first and second valve surfaces of the stator so as to limit gas leakage from and between the compartments.

30. The apparatus of claim 27, in which the flow path in each adsorber element is directed substantially radially from the rotational axis, and the first and second valve surfaces are defined respectively by an outer cylindrical wall and an inner cylindrical wall of the rotor, with the angularly spaced adsorber elements being separated by partitions extending radially between the outer and inner cylindrical walls, and with the outer and inner cylindrical walls being penetrated respectively by first and second apertures for each adsorber element.

31. The apparatus of claim 30, in which the adsorber elements are provided as granular adsorbent between the partitions and retained by support screens adjacent the first and second apertures.

32. The apparatus of claim 27, in which the adsorber elements are provided from layered adsorbent sheets, the sheets being formed of adsorbent material and an inert reinforcement material, with spacers between the sheets to establish flow channels between adjacent pairs of sheets.

33. The apparatus of claim 32, the adsorber elements being installed as angularly spaced rectangular blocks within the rotor and between the first and second valve surfaces, with the adsorbent sheets as substantially flat sheets extending parallel to the plane defined by the axis of the rotor and a radius from the axis through the rectangular block, and the flat adsorbent sheets being layered with flow channels therebetween to form the rectangular block.

34. The apparatus of claim 33, in which the number of angularly spaced and cooperating adsorber elements in the rotor is greater than the number of compartments in the first and second valve surfaces.

35. The apparatus of claim 27, in which the adsorber elements are provided from substantially flat adsorbent sheets layered to form rectangular blocks, the sheets being formed of adsorbent material and an inert reinforcement material, with spacers between the sheets to establish flow channels between adjacent pairs of sheets, the adsorber elements being installed between adjacent pairs of the partitions, with the adsorbent sheets extending parallel to the plane defined by the axis of the rotor and a radius from the axis through the rectangular block, and the flow channels being substantially radially directed.

36. The apparatus of claim 27, with means for a stage of light reflux pressure let-down to continuously withdraw gas depleted in the more readily adsorbed component from a compartment in the second valve surface at a light reflux exit pressure and to continuously return that gas to a compartment in the second valve surface at a light reflux return pressure which is less than the light reflux exit pressure for that stage.

37. The apparatus of claim 36, with the light reflux pressure stage characterized by a light reflux exit pressure which is the higher pressure or a blowdown intermediate pressure, and by a light reflux return pressure which is a pressurization intermediate pressure greater than the lower pressure.

38. The apparatus of claim 36, with the light reflux pressure stage characterized by a light reflux exit pressure which is a blowdown intermediate pressure less than the higher pressure, and a light reflux return pressure which is a pressurization intermediate pressure or the lower pressure.

39. The apparatus of claim 36, with a plurality of stages of light reflux pressure let-down at successively descending intermediate pressures.

40. The apparatus of claim 39, with a light reflux expander means for each stage.

41. The apparatus of claim 40, with heater means cooperating with each light reflux expander so as to heat the light reflux gas before pressure let-down.

42. The apparatus of claim 41, in which the feed gas mixture is air, the adsorbent material includes a strongly nitrogen-selective zeolite, the light product is enriched oxygen, and the temperature at the second end of the adsorber elements is elevated.

43. The apparatus of claim 42, in which the zeolite includes Li-X.

44. The apparatus of claim 42, in which the zeolite includes calcium chabazite.

45. The apparatus of claim 40, with an impulse turbine as the light reflux expander, the expander having an impulse bladed runner, with a separate nozzle and diffuser in a sectoral arc of the turbine for each expander stage.

46. The apparatus of claim 40, with each stage of the light reflux expander provided as a stage of a multistage radial turbine.

47. The apparatus of claim 40, with each stage of the light reflux expander provided as a stage of a multistage axial turbine.

48. The apparatus of claim 27, with a countercurrent blowdown expander for pressure let-down of gas enriched in the more readily adsorbed component from a blowdown compartment in the first valve surface, so as to reduce the pressure of that gas from the countercurrent blowdown intermediate pressure of that compartment to a heavy product delivery pressure.

49. The apparatus of claim 48, with heater means cooperating with the countercurrent blowdown expander so as to heat the gas enriched in the more readily adsorbed component before pressure let-down.

50. The apparatus of claim 48, with each stage of the countercurrent blowdown expander provided as a radial turbine stage.

51. The apparatus of claim 48, with each stage of the countercurrent blowdown expander provided as an axial turbine stage.

52. The apparatus of claim 48, with an impulse turbine as the countercurrent blowdown expander, the expander having an impulse bladed runner, with a separate nozzle and diffuser in a sectoral arc of the turbine for each expander stage.

53. The apparatus of claim 27, also including a heavy product compressor delivering gas enriched in the more readily adsorbed component at a heavy product delivery pressure greater than the lower pressure.

54. The apparatus of claim 53, in which the heavy product compressor compresses gas enriched in the more readily adsorbed component from the heavy product compartment in the first valve surface, so as to increase the pressure of that gas from substantially the lower pressure to the heavy product delivery pressure.

55. The apparatus of claim 53, in which the heavy product compressor compresses gas enriched in the more readily adsorbed component from a blowdown compartment in the first valve surface whose intermediate pressure is less than the heavy product delivery pressure, so as to increase the pressure of that gas to the heavy product delivery pressure.

56. The apparatus of claim 53, in which the heavy product compressor is driven at least in part by a countercurrent blowdown expander stage cooperating with a countercurrent blowdown compartment whose intermediate pressure is greater than the heavy product delivery pressure.

57. The apparatus of claim 56, in which the heavy product compressor is driven solely by one or a plurality of countercurrent blowdown expander and/or light reflux expander stages.

58. The apparatus of claim 53, in which the heavy product compressor is driven at least in part by a light reflux expander.

59. The apparatus of claim 53, in which the heavy product delivery pressure is substantially atmospheric pressure, and the heavy product compressor is provided as a vacuum pump.

60. The apparatus of claim 59, with the vacuum pump provided as a multistage centrifugal vacuum pump.

61. The apparatus of claim 59, with the vacuum pump provided as a multistage axial vacuum pump.

62. The apparatus of claim 27 including a feed compressor, and with a feed compressor stage delivering feed gas mixture to the feed compartment at substantially the higher pressure.

63. The apparatus of claim 62, in which a feed compressor stage is driven at least in part by a countercurrent blowdown expander stage cooperating with a countercurrent blowdown compartment whose intermediate pressure is greater than the heavy product delivery pressure.

64. The apparatus of claim 62, in which a feed compressor stage is driven at least in part by a light reflux expander.

65. The apparatus of claim 62, with the feed compressor driven at least in part by a prime mover, and providing feed gas mixture to a plurality of modules in parallel.

66. The apparatus of claim 65, in which the lower pressure is below atmospheric pressure, and the apparatus includes a vacuum pump driven at least in part by the prime mover, the vacuum pump compressing heavy product from the modules in parallel to a heavy product delivery pressure.

67. The apparatus of claim 27, in which the pressurization compartments include a feed pressurization compartment in the first valve surface, and the apparatus includes a feed compressor stage delivering feed gas mixture to the feed pressurization compartment at an intermediate pressure less than the higher pressure.

68. The apparatus of claim 67, with a plurality of feed compressor stages each delivering feed gas mixture to a feed pressurization compartment at successively ascending intermediate pressures less than the higher pressure, and finally a feed compressor stage delivering feed gas mixture to the feed compartment at substantially the higher pressure.

69. The apparatus of claim 68, with means to cool the feed gas mixture delivered by a feed compressor stage.

70. The apparatus of claim 69, with means to remove liquid condensate from the feed gas mixture delivered by a feed compressor stage.

71. The apparatus of claim 68, in which feed compressor stages are provided as stages of a multistage centrifugal compressor.

72. The apparatus of claim 68, in which feed compressor stages are provided as stages of a multistage axial compressor.

73. The apparatus of claim 68, in which the feed compressor stages include one or a plurality of stages driven at least in part by a prime mover, and the remaining feed compressor stage(s) are driven solely by one or a plurality of countercurrent blowdown expander and/or light reflux expander stages.

74. The apparatus of claim 73, with a plurality of modules to which feed gas mixture is delivered in parallel by the feed compressor stage(s) driven by the prime mover, and with a free rotor compressor for each module in which the remaining feed compressor stage(s) are driven solely by one or a plurality of countercurrent blowdown expander and/or light reflux expander stages.

75. The apparatus of claim 27, with a plurality of feed compartments in the first valve surface, and with means to supply feed gas mixtures of successively higher concentration in the more readily adsorbed component to each of said feed compartments at substantially the higher pressure, so that feed gas mixtures of ascending concentration in the more readily adsorbed component is supplied to each adsorber element from its first aperture while opened successively to those feed compartments at substantially the higher pressure.

76. The apparatus of claim 75, with a heavy reflux compressor for compression of gas enriched in the more readily adsorbed component from a blowdown compartment in the first valve surface, so as to increase the pressure of that gas from the countercurrent blowdown intermediate pressure of that compartment to substantially the higher pressure, and returning the heavy reflux gas to a feed compartment.

77. The apparatus of claim 75, with a heavy reflux compressor for compression of gas enriched in the more readily adsorbed component from the heavy product compartment, so as to increase the pressure of that gas from substantially the lower pressure to substantially the higher pressure, and returning the heavy reflux gas to a feed compartment.

78. The apparatus of claim 27, in which the feed gas mixture is air, the adsorbent material includes a nitrogen-selective zeolite, and the light product is enriched oxygen.

79. A rotary module for implementing a pressure swing adsorption process having an operating pressure cycling between an upper pressure and a lower pressure for extracting a first gas fraction and a second gas fraction from a gas mixture including the first and second fractions, the rotary module comprising:

a stator including a first stator valve surface, a second stator valve surface, a plurality of first function compartments opening into the first stator valve surface, and a plurality of second function compartments opening into the second stator valve surface; and a rotor rotatably coupled to the stator and including a first rotor valve surface in communication with the first stator valve surface, a second rotor valve surface in communication with the second stator valve surface, a plurality of flow paths for receiving adsorbent material therein, each said flow path including a pair of opposite ends, and a plurality of apertures provided in the rotor valve surfaces and in communication with the flow path ends and the function compartments for cyclically exposing each said flow path to a plurality of discrete pressure levels between the upper and lower pressures for maintaining uniform gas flow through the first and second function compartments.

80. The rotary module according to claim 79, wherein the function compartments are shaped to provide uniform gas flow through the flow paths.

81. The rotary module according to claim 79, wherein at least one of the valve surfaces includes a sealing strip for reducing gas flow loss between the valve surfaces, the sealing strip including a tapered portion for providing uniform gas flow through the flow paths.

82. The rotary module according to claim 81, wherein the sealing strip is shaped to provide rapid closing of the flow paths.

83. The rotary module according to claim 79, wherein each said function compartment simultaneously communicates with at least two flow paths for providing uniform gas flow through the function compartments.

84. The rotary module according to claim 79, wherein each said function compartment is coupled immediately adjacent to a respective end of a respective one of the flow paths for implementing high frequency pressure swing adsorption.

85. The rotary module according to claim 84, wherein the function compartments are positioned a distance from the respective flow path ends sufficient for implementing the pressure swing adsorption process at a rotor rotational speed of at least 20 revolutions per minute.

86. The rotary module according to claim 79, wherein the function compartments include a plurality of pressurization compartments for subjecting the flow paths to a plurality of incremental pressures increases.

87. The rotary module according to claim 86, wherein the pressurization compartments comprise gas feed compartments opening into the first stator valve surface for delivering the gas mixture to the flow paths at a plurality of incrementally different pressures.

88. The rotary module according to claim 86, wherein the pressurization compartments comprise light reflux return compartments opening into the second stator valve surface for delivering light reflux gas to the flow paths at a plurality of incrementally different pressures.

89. The rotary module according to claim 79, wherein the first function compartments include a plurality of blowdown compartments for subjecting the flow paths to a plurality of incremental pressure drops.

90. The rotary module according to claim 89, wherein the blowdown compartments comprise light reflux exit compartments opening into the second stator valve surface for removing light reflux gas from the flow paths at a plurality of incrementally different pressures.

91. The rotary module according to claim 89, wherein the blowdown compartments comprise countercurrent blowdown compartments opening into the first stator valve surface for removing heavy product gas from the flow paths at a plurality of incrementally different pressures.

92. The rotary module according to claim 79, wherein the function compartments are disposed around the respective valve surfaces for conveying gas along the flow paths in a common predetermined sequence for each flow path, the sequence for each flow path comprising delivering the gas mixture at the upper pressure from a gas feed function compartment to the flow path end adjacent the first rotor valve surface while removing light product gas at the upper pressure from the flow path end adjacent the second rotor valve surface to a light product function compartment, removing heavy product gas at the lower pressure from the flow path end adjacent the first rotor valve surface to a heavy product gas function compartment, and delivering gas at a pressure intermediate the upper and lower pressure from a repressurization function compartment to the flow path end adjacent the first rotor valve surface ahead of the gas feed function compartment.

93. The rotary module according to claim 79, wherein the function compartments are disposed around the respective valve surfaces for conveying gas along the flow paths in a common predetermined sequence for each flow path, the sequence for each flow path comprising delivering the gas mixture at the upper pressure from a gas feed function compartment to the flow path end adjacent the first rotor valve surface while removing light product gas at the upper pressure from the flow path end adjacent the second rotor valve surface to a light product function compartment, removing gas at a pressure intermediate the upper and lower pressures from the flow path end adjacent the second rotor valve surface to a cocurrent blowdown function compartment, and removing heavy product gas at the lower pressure from the flow path end adjacent the first rotor valve surface to a heavy product gas function compartment.

94. The rotary module according to claim 79, wherein the function compartments are disposed around the respective valve surfaces for conveying gas along the flow paths in a common predetermined sequence for each flow path, the sequence for each flow path comprising delivering the gas mixture at the upper pressure from a gas feed function compartment to the flow path end adjacent the first rotor valve surface while removing light product gas at the upper pressure from the flow path end adjacent the second rotor valve surface to a light product function compartment, removing gas at a pressure intermediate the upper and lower pressures from the flow path end adjacent the first rotor valve surface to a countercurrent blowdown function compartment, and removing heavy product gas at the lower pressure from the flow path end adjacent the first rotor valve surface to a heavy product gas function compartment.

95. The rotary module according to claim 79, wherein each said flow path includes a laminated sheet adsorber.

96. A rotor module for use with a stator for implementing a pressure swing adsorption process having an operating pressure cycling between an upper pressure and a lower pressure, the rotor module comprising:

an annular rotor including a first rotor valve surface for communicating with a first stator valve surface of the stator, a second rotor valve surface for communicating with a second stator valve surface of the stator, a plurality of flow paths spaced around the rotor and extending between the rotor valve surfaces, and a plurality of apertures provided in the rotor valve surfaces in communication with the flow paths for cyclically exposing each said flow path to a plurality of discrete pressure levels between the upper and lower pressures; and a plurality of adsorbent beds disposed in the flow paths in communication with the apertures.

97. The rotor module according to claim 96, wherein each said adsorbent bed comprises at least two laminated adsorbent sheets, each said sheet including a reinforcement matrix, an adsorbent material deposited therein, a binder for securing the adsorbent material to the binder, and a spacer provided between the two laminated sheets for providing a flow channel therebetween.

98. The rotor module according to claim 97, wherein the reinforcement material is selected from glass fiber and metal wire matrix.

99. The rotor module according to claim 97, wherein the adsorbent material comprises zeolite crystallites.

100. The rotor module according to claim 96, wherein the flow paths include a pair of opposite ends, and each said aperture is disposed immediately adjacent to a respective one of the opposite ends.

101. A pressure swing adsorption system for extracting a first gas fraction and a second gas fraction from a gas mixture including the first and second fractions, the pressure swing adsorption system comprising:

a rotary module coupled to a gas feed manifold, a heavy product manifold, and a light product manifold, the rotary module comprising:

a stator including a first stator valve surface, a second stator valve surface, a plurality of first function compartments opening into the first stator valve surface, and a plurality of second function compartments opening into the second stator valve surface; and a rotor rotatably coupled to the stator and including a first rotor valve surface in communication with the first stator valve surface, a second rotor valve surface in communication with the second stator valve surface, a plurality of flow paths for receiving adsorbent material therein, each said flow path including a pair of opposite ends, and a plurality of apertures provided in the rotor valve surfaces and in communication with the flow path ends and the function ports; and compression/expansion machinery coupled to the rotary module for maintaining the function ports at a plurality of discrete pressure levels between an upper pressure and a lower pressure for maintaining uniform gas flow through the first and second function compartments.

102. The pressure swing adsorption system according to claim 101, wherein the function compartments include a plurality of gas feed compartments, and the compression/expansion machinery comprises a multi-stage compressor including a plurality of pressure output ports, each said pressure output port being coupled to a respective one of the feed compartments for delivering feed gas to the flow paths at a plurality of pressure increments.

103. The pressure swing adsorption system according to claim 102, wherein the multistage compressor comprises a centrifugal compressor having a plurality of stages, each said stage including a gas inlet, a diffuser, and an impeller coupled to the gas inlet and having an axis of rotation for accelerating gas from the gas inlet towards the diffuser.

104. The pressure swing adsorption system according to claim 102, wherein the function compartments include a plurality of blowdown compartments, and the compression/expansion machinery includes a multi-stage vacuum pump coupled to the compressor, the vacuum pump including a plurality of pressure inlet ports, each said pressure inlet port being coupled to a respective one of the blowdown compartments for receiving blowdown gas from the flow paths at a plurality of pressure increments.

105. The pressure swing adsorption system according to claim 102, wherein the function compartments include a plurality of blowdown compartments, and the pressure swing adsorption system includes a plurality of throttle orifices coupled to the blowdown compartments for releasing blowdown gas from the flow paths at a plurality of pressure increments.

106. The pressure swing adsorption system according to claim 101, wherein the function compartments include a plurality of countercurrent blowdown compartments and a plurality of cocurrent blowdown compartments, and the compression/expansion machinery comprises a first expander coupled to the countercurrent blowdown compartments and a second expander coupled to the first expander and to the cocurrent blowdown compartments.

107. The pressure swing adsorption system according to claim 106, wherein the function compartments include a plurality of gas feed compartments, and the compression/expansion machinery includes a compressor coupled to the gas feed compartments and to the first and second expanders.

* * * * *